Figure 1:
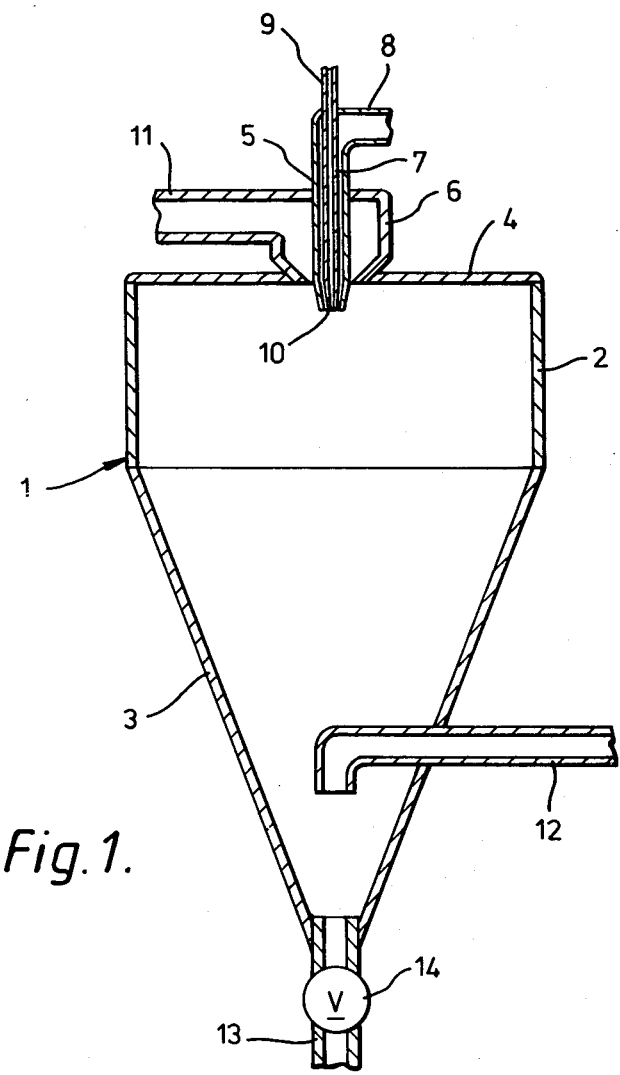

United States Patent [19]

McKenzie

[11] Patent Number: 4,465,783

[45] Date of Patent: Aug. 14, 1984

[54] SPRAYING SOLID

[75] Inventor: Ian D. McKenzie, Welwyn Garden City, England

[73] Assignee: Imperial Chemical Industries PLC, London, England

[21] Appl. No.: 405,983

[22] Filed: Aug. 6, 1982

[30] Foreign Application Priority Data

Aug. 7, 1981 [GB] United Kingdom ............... 8124147
Aug. 7, 1981 [GB] United Kingdom ............... 8124153
Nov. 23, 1981 [GB] United Kingdom ............... 8135235

[51] Int. Cl.$^3$ ........................... C08F 4/62; C08F 4/64; C08F 4/68

[52] U.S. Cl. .................................. 502/105; 502/103; 502/109; 502/121; 502/127; 502/134; 526/125; 526/139; 526/142

[58] Field of Search ........... 252/429 A, 429 B, 429 C; 502/105, 103, 134, 127, 121, 109

[56] References Cited

U.S. PATENT DOCUMENTS

| | | | |
|---|---|---|---|
| 3,591,656 | 7/1971 | Kroll | 252/429 X |
| 3,953,414 | 4/1976 | Galli et al. | 252/429 B X |
| 4,013,823 | 3/1977 | Longi et al. | 252/424 B X |
| 4,107,415 | 8/1978 | Giannini et al. | 252/429 B X |
| 4,111,835 | 9/1978 | Foschini et al. | 252/429 B X |
| 4,168,361 | 9/1979 | Oda et al. | 252/429 B X |
| 4,293,673 | 10/1981 | Hamer et al. | 252/429 B X |
| 4,376,062 | 3/1983 | Hamer et al. | 252/429 B |

FOREIGN PATENT DOCUMENTS

| | | |
|---|---|---|
| 862135 | 6/1978 | Belgium. |
| 1527736 | 10/1975 | United Kingdom. |
| 1421943 | 1/1976 | United Kingdom. |
| 1485181 | 9/1977 | United Kingdom. |
| 1512730 | 1/1978 | United Kingdom. |
| 2006227 | 5/1979 | United Kingdom. |
| 1559194 | 1/1980 | United Kingdom. |

Primary Examiner—Patrick Garvin
Attorney, Agent, or Firm—Cushman, Darby & Cushman

[57] ABSTRACT

A solid material which is a transition metal composition, or a support for a transition metal compound, is suspended in a liquid medium, the mixture is subjected to mechanical action and the treated mixture is spray-dried. If the solid is a support material, it is subsequently contacted with a transition metal compound. The mechanical action can be a grinding process or a process providing simultaneous vigorous agitation and a shearing action. The transition metal composition may be used with an organic metal compound to polymerize an unsaturated monomer to give a polymer of good particle form.

11 Claims, 2 Drawing Figures

SPRAYING SOLID

The present invention relates to processes of spraying a suspension of a solid in a liquid, the use of the solid product for the production of a component of a catalyst system and the use of the catalyst system for the polymerisation of unsaturated monomers, particularly olefin monomers such as ethylene and propylene.

Many of the catalyst systems used for the polymerisation of unsaturated monomers such as ethylene and propylene, include a solid transition metal component. This solid transition metal component may be a solid transition metal compound, a solid transition metal compound which includes a compound of another metal, for example as in many commercially available titanium trichloride materials which are available as materials containing aluminium compounds in the titanium trichloride lattice, or transition metal compounds which are supported on a suitable support material. For the most efficient production of olefin polymers, it is desirable that the polymer should be recovered with the minimum number of processing stages in the recovery process. Thus, it is desirable that the catalyst system should be capable of producing the polymer in a high yield such that there is no need to remove catalyst residues. For the polymerisation of higher olefin monomers, such as propylene, it is also desirable that the production of the undesirable atactic polymer is minimised whereby it is possible to dispense with the removal of any of this atactic material. Many catalyst systems having high polymerisation activity and the required high stereospecificity are produced by a process which includes a stage in which a solid material is ground. The result of grinding of the solid material is to give particles having an irregular particle form and a wide particle size distribution. The particle form of the ground solid material is such that handling of the solid material can give problems. Furthermore, in the production of propylene polymers, the polymer typically replicates, on a larger scale, the particle form and particle size distribution of the catalyst material and hence the polymer formed using such ground materials frequently has undesirable powder flow characteristics.

To improve the particle form of a solid catalyst component, it has been proposed that a transition metal containing material should be subjected to a spray-drying step, for example, as described in European Patent application Publicaton No. 0 037 182. However, some of the particles present in the initial solid material may have a size and form which is such that they are not readily spray-dried.

According to the present invention there is provided a process wherein a solid material is mixed with a liquid medium, which is a liquid hydrocarbon, a liquid halohydrocarbon, a liquid compound of a transition metal of Group IV to VIA of the Periodic Table or a solution of a compound of a transition metal of Group IVA to VIA of the Periodic Table in a liquid hydrocarbon or liquid halohydrocarbon, the mixture of the solid material and the liquid medium is subjected to mechanical action to cause a reduction in the particle size of the solid material, the resulting mixture is spray-dried and the spray-dried solid material is collected, wherein either (1) the solid material is at least one compound of a transition metal of Group IVA, VA or VIA of the Periodic Table or contains at least one compound of a transition metal of Group IVA, VA or VIA of the Periodic Table, or (2) after being subjected to the mechanical action, and before or after spray-drying, the solid material is contacted with at least one compound of a transition metal of Group IVA, VA or VIA of the Periodic Table.

All references herein to the Periodic Table are to the Short Periodic Table as set out inside the back cover of "General and Inorganic Chemistry" by J. R. Partington, Second Edition, published by MacMillan and Company Limited, London, 1954.

For convenience hereafter, the term "pulverising" will be used to mean the process of subjecting the mixture to mechanical action to cause a reduction in the particle size of the solid material.

For convenience hereafter, the term "transition metal" will be used to mean a transition metal of Group IVA, VA or VIA of the Periodic Table. The transition metal may be, for example, vanadium or zirconium and is preferably titanium. Preferred transition metal compounds are the halides or oxyhalides, for example, vanadium tetrachloride, vanadium oxytrichloride, zirconium tetrachloride and especially preferred are the titanium halides such as titanium tetrachloride and titanium trichloride. Whilst more than one compound of a transition metal may be used, for example a mixture of a vanadium halide and a titanium halide such as a mixture of vanadium tetrachloride and titanium tetrachloride on a suitable support, it is generally preferred, especially if the final product is to be used for the polymerisation of propylene or other higher alpha-olefin mononer, to use only one transition metal compound, which is preferably a titanium halide.

If the solid material is a solid compound of a transition metal, this is preferably titanium trichloride, which term is used herein to include not only pure titanium trichloride but also the products of reducing titanium tetrachloride with organic aluminium compounds or aluminium metal, which materials include in the lattice aluminum halides and possibly organic aluminium compounds.

Alternatively, the solid material may be a compound of a transition metal compound on a suitable support material. Suitable support materials include metal oxides, in particular the oxides of the metals of Groups I to IV, including silicon, of the Periodic Table. Thus, the support may be an oxide such as magnesia, alumina, silica, or mixtures or compounds of any one or more of these materials, although it will be appreciated that other metal oxides may also be used. However, catalyst systems which are both highly active and highly stereospecific have been disclosed in which the support material is a metal halide, and in particular is magnesium chloride. Hence, the use of a solid material which is a metal halide, or a compound of a transition metal on a metal halide, is a preferred aspect of the present invention.

It is possible to use, as the solid material, a material which does not contain a compound of a transition metal. If such a solid material is used, then after pulverising the mixture, and before or after spray-drying, the solid material is treated with a compound of a transition metal. This treatment with the compound of a transition metal is conveniently effected by treating the solid material with a liquid medium which is either a liquid compound of a transition metal or a solution of a compound of a transition metal in an appropriate solvent.

The preferred compound of a transition metal for this subsequent treatment is titanium tetrachloride which may be used in the undiluted form or as a solution in a suitable solvent, in particular a hydrocarbon solvent such as an aliphatic hydrocarbon.

According to a further alternative procedure, more than one solid material may be used and, in particular, one solid material is, or contains, at least one compound of a transition metal and one solid material is free from any compound of a transition metal. Examples of the use of more than one solid material are a mixture of titanium trichloride and silica or a mixture of silica and the product of contacting titanium tetrachloride with magnesium chloride. If more than one solid material is used, it is possible to use one of the solid materials in all stages of the process of the present invention and to add the other solid at a subsequent stage, before the spray-drying stage. However, it is preferred that any solid material which is added after pulverising the mixture of solid material and liquid medium is of a fine particle size, particularly with essentially all particles having a maxiumum dimension of less than 10 microns and especially of not more than 5 microns.

Typically, prior to effecting the mixing with the liquid medium, pulverising and spray-drying, the solid material is subjected to an optional preliminary stage, particularly a preliminary grinding stage, in which the solid material is ground in the essential absence of the liquid medium and in the presence of a modifying substance such as, for example, a Lewis Base compound. By "essential absence of a liquid medium" we mean that any liquid which is present, other than the modifying substance, does not form a separate liquid phase. It will be appreciatd that some liquid can be absorbed by the solid material and hence that the total absence of an added liquid medium is not required. Typically, the amount of the liquid medium is not more than 0.2 cm$^3$, and especially not more than 0.1 cm$^3$, for each gramme of the solid material.

The Lewis Base compound which may be used as the modifying substance can be any Lewis Base compound, especially an organic Lewis Base compound, which has previously been proposed for use in an olefine polymerisation catalyst system. Thus, the Lewis Base compound may be an ether, an ester, a ketone, an alcohol, an ortho-ester, a sulphide (a thioether), an ester of a thiocarboxylic acid (a thioester), a thioketone, a thiol, a sulphone, a sulphonamide, a fused ring compound containing a heterocyclic sulphur atom, an organic silicon compound such as a silane or a siloxane, an amide such as formamide, urea and substituted derivatives thereof such as tetramethyl urea, thiourea, an alkanolamine, an amine, which term includes a cyclic amine, a diamine, or a polyamine, for example, pyridine, quinoline, or tetramethylethylenediamine, or an organic phosphorous compound such as an organic phosphine, an organic phosphine oxide, an organic phosphite or an organic phosphate. The use of organic Lewis Base compounds is disclosed, inter alia, in British Patent specification Nos. 803 198, 809 717, 880 998, 896 509, 920 118, 921 954, 933 236, 940 125, 966 025, 969 074, 971 248, 1 013 363, 1 017 977, 1 049 723, 1 122 010, 1 150 850, 1 208 815, 1 234 657, 1 324 173, 1 359 328, 1 383 207, 1 387 890, 1 423 658, 1 423 659, 1 423 660, 1 495 031, 1 527 736, 1 554 574 and 1 559 194.

Lewis Bases which have been disclosed as being particularly useful in the production of polymerisation catalysts include ethers, esters, organic silicon compounds and organic phosphorous compounds. Particular examples of ethers are the aliphatic ethers such as di-n-butyl ether and di-iso-amyl ether. The esters may be the esters of saturated or unsaturated acids, for example, ethyl acetate and methyl methacrylate but it is particularly preferred to use the esters of the carboxylic acids containing an aromatic group such as, for example, ethyl benzoate, butyl benzoate, methyl p-methylbenzoate, ethyl p-methoxybenzoate and ethyl phenylacetate. Other esters which may be used are the mono- and poly-esters of saturated and unsaturated polycarboxylic acids (which term includes dicarboxylic acids) such as dialkyl phthalates. Organic silicon compounds may be compounds containing one or more SI—OR, Si—OCOR or Si—NR$_2$ bonds, where R is a hydrocarbyl group, and include phenyltriethoxy-silane, diphenyldi-isobutoxysilane and isobutyl-triethoxysilane. The organic phosphorous compound may be an organic phosphine such as tributyl phosphine or triphenyl phosphine or may be a phosphate oxide such as triphenyl phosphine oxide, or an amino derivative thereof such as hexamethyl phosphoric triamide.

Processes in which a solid compound of a transition metal such as titanium trichloride is ground in the presence of a Lewis Base compound are disclosed in a number of documents such as, for example, British Patent specification No. 1 421 943, 1 485 181 and 1 512 730 and Belgian Patent specification No. 862 135. Grinding of a solid material such as magnesium chloride in the presence of a Lewis Base compound is disclosed, for example, in British Patent specification Nos. 1 527 736 and 1 559 194. The amount of Lewis Base compound used in the optional preliminary grinding can be any quantity used previously but typically does not exceed one mole of Lewis Base compound for each mole of the solid material. When the solid material is, or contains, a transition metal compound, the amount of Lewis Base compound preferably does not exceed one mole for each mole of the transition metal compound and particularly is in the range from 0.1 up to 0.5 mole of the Lewis Base compound for each mole of the transition metal compound. The optional preliminary grinding is effected for a time which is dependent on the intensity of the grinding but, using a rotating or vibrating ball mill, typically will be from 0.5 hours up to 100 hours, with the vibrating ball mill generally requiring a shorter time. The grinding temperature can be within a wide range of temperature, for example from −50° C. up to 100° C. and the temperature can be varied during the course of the milling. For many materials, temperatures in the range 0° C. up to 50° C. are suitable.

Although the optional preliminary step is preferably effected by grinding the solid material in the presence of a Lewis Base compound, this preliminary step may be effected by contacting the solid material with a Lewis Base compound in the absence of grinding. More specifically, the solid material may be contacted either with a liquid Lewis Base compound or with a solution of a Lewis Base compound in a suitable liquid medium. The contacting with the Lewis Base compound is preferably effected at an elevated temperature for an appropriate period of time which may be from 5 minutes up to 10 hours. The treatment of a solid material with a Lewis Base compound without grinding is disclosed, for example, in British Patent specification No. 1 391 067.

If the solid material is a compound of a transition metal on a support material, the optional preliminary stage may be used to effect contacting between the compound of a transition metal and the support material, and optionally a Lewis Base compound. Such contacting can be effected with or without a grinding stage but typically will include a grinding stage as at least part of such contacting.

After being subjected to the optional preliminary stage in which it may be contacted with a modifying substance, the solid material is then mixed with a liquid medium, pulverised and spray-dried. However, it is not necessary to use a solid-material which has been pretreated with a Lewis Base compound. If a Lewis Base compound is to be used, the treatment with the Lewis Base compound may be effected simultaneously with one of the stages of the process of the present invention, particularly this treatment may be combined with the stage of pulverising of the mixture of the solid material and the liquid medium. More specifically, the pulverising in the presence of the liquid medium may be effected in the presence of a Lewis Base compound which is present either as the liquid medium or as a solution in the liquid medium in which the solid material is suspended. If such a procedure is used, it is preferred that the liquid medium is a solution containing a dissolved Lewis Base compound. Alternatively, the treatment with the Lewis Base compound may be effected between the stages of the process of the present invention or may be effected after the spray-drying stage.

If the solid material does not include a compound of a transition metal, a compound of a transition metal may be present in the liquid medium with which the solid material is mixed prior to pulverising the mixture. Thus, the solid may be mixed with a solution of a compound of a transition metal in a suitable liquid medium or even in a liquid compound of a transition metal, and this mixture may then be pulverised and subsequently spray-dried. Furthermore, it is possible to mix the solid material with a liquid medium which is, or which contains, both a Lewis Base compound and a compound of a transition metal. However, mixing the solid material with a liquid medium which is, or which contains, a Lewis Base compound and/or a compound of a transition metal, pulverising the mixture and spray-drying the ground mixture is not a preferred embodiment of the present invention.

If the solid material which is mixed with the liquid medium and pulverised is not a compound of a transition metal, or a solid containing a compound of a transition metal, the solid material, before or after spray-drying, is subjected to a post-treatment with a compound of a transition metal. Suitable treatments with compounds of a transition metal are described in, for example, British Patent specification Nos. 1 527 736 and 1 559 194 and also in British Patent specification No. 2,103,627A entitled "Transition Metal Composition Production and Use". In the process of our said copending application, a composition of a magnesium halide and an ester of a carboxylic acid is formed, typically by cogrinding the magnesium halide and the ester, the composition is contacted with hot titanium tetrachloride, the contacting with hot titanium tetrachloride is repeated and thereafter the product obtained is subjected to a mild washing procedure which is sufficient to remove only a part of the soluble titanium species from the product. In the preferred procedure of British Patent application No. 2 103 627A, a transition metal composition is obtained by cogrinding magnesium chloride with ethyl benzoate, suspending the coground product in titanium tetrachloride at a temperature of at least 60° C., separating the solid from the titanium tetrachloride, repeating the treatment with the titanium tetrachloride and washing the product obtained not more than twice with heptane at a temperature of at least 60° C. In the titanium chloride composition thus obtained, a substantial proportion, which may be more than 50% of the titanium, may be capable of being extracted by continued washing with hot heptane.

Alternatively, the process of the present invention may be included in the process of our copending Patent application No. 444,364 entitled "Composition Production and Use". In accordance with copending Patent application No. 444,364 a titanium-containing composition is obtained by contacting a magnesium halide with at least one compound of a non-metallic element, other than oxygen, of Group IV to VI of the Periodic Table, and contacting the product obtained with a liquid phase containing titanium tetrachloride, where the compound of the non-metallic element also contains oxygen and halogen, there being one or two atoms of oxygen for each molecule and sufficient halogen to satisfy the residual valencies of the non-metallic element which may be carbon, phosphorus or sulphur. It is preferred that the magnesium halide material is also contacted with a Lewis Base compound, for example an ester such as ethyl benzoate. The compound of the non-metallic element will hereafter be referred to as the "non-metallic halide" and is typically thionyl chloride ($SOCl_2$). In accordance with the preferred procedure of copending Patent application Serial No. 444,364, the magnesium halide is ground with thionyl chloride and an ester such as ethyl benzoate, subsequently suspended at least once in undiluted titanium tetrachloride at a temperature of at least 60° C. and washed at least once with heptane at a room temperature of at least 60° C. Pulverising and spray-drying in accordance with the present invention may be incorporated at any suitable stage in the procedure of copending Patent application Serial No. 444,364.

Whilst the mixture of the solid material and the liquid medium may be subjected to an intermediate treatment stage, for example by contacting with a compound of a transition metal, between the pulverising and spray-drying stages, we prefer to effect the pulverising and spray-drying stages in succession with no intervening treatment stages.

It will be appreciated that a spray-dried solid material which is, or which contains, a compound of a transition metal, may be subjected to further treatments after spray-drying, for example, with a Lewis Base compound, or a non-metallic halide, or a compound of a transition metal. Such further treatments may be with a Lewis Base compound, or a non-metallic halide, which is the same as, or different from, any Lewis Base compound, or any non-metallic halide with which the solid material has been treated previously. Similarly the compound of a transition metal used in such a further treatment may be the same as, or different from, any compound of a transition metal used in the preparation of the spray-dried material.

The liquid medium which is mixed with the solid material is preferably one which does not have a harmful effect on the spray-dried, solid material which contains a compound of a transition metal, when this spray-dried solid material is used as a polymerisation catalyst component.

It is generally preferred to use an inert liquid, particularly a hydrocarbon or inert halohydrocarbon, as the liquid medium, this being particularly preferred if contacting with a compound of a transition metal is effected after the pulverising step and before the spray-drying step. Thus, the liquid medium is preferably an aliphatic hydrocarbon such as hexane, heptane, octane, decane, dodecane or mixtures thereof, or an aromatic hydrocarbon such as benzene, toluene or xylene or a halohydrocarbon such as chlorobenzene or 1,2-dichloroethane.

Alternatively, the liquid medium may be, or may contain, a compound of a transition metal but, if it is necessary to effect contacting of the solid material with a compound of a transition metal, it is preferred that this contacting is effected as a step which is separate from any pulverising of the solid material and the liquid medium which is, or which contains, a compound of a transition metal.

The relative proportions of the solid material and the liquid medium should preferably be such that, at the end of the pulverising stage, the mixture is a mobile suspension of the solid material in the liquid medium. Thus, it is preferred to use the liquid medium in the proportions of at least 1 cm$^3$ of the liquid medium for each gramme of the solid material. It is particularly preferred to use at least 3 cm$^3$ of the liquid medium for each gramme of the solid material but in general the quantity of the liquid medium should not exceed 20 cm$^3$, and particularly should not exceed 10 cm$^3$, for each gramme of the solid material.

The pulverising of the mixture of the solid material and the liquid medium can be effected using any technique wherein mechanical action causes a reduction in the particle size of the solid material. It will be appreciated that a reduction in the particle size is used herein to mean that the weight average particle size of the solid material after being subjected to the mechanical action is less than the weight average particle size of the solid material before being subjected to the mechanical action. The particle size of the solid material after the pulverising stage will be dependent on the nature of the solid material, the initial particle size of the solid material and the duration and intensity of the pulverising stage. In general the weight average particle size of the pulverised solid material is less than 15 microns and particularly does not exceed 10 microns.

One pulverising process which may be used in accordance with the present invention is to grind the mixture of the solid material and the liquid medium. This grinding may be effected in the same type of grinding apparatus, for example a rotating or vibrating ball mill, as can be used to effect the optional preliminary grinding stage. If an optional preliminary grinding stage is effected, pulverisation by grinding a mixture of the solid material and the liquid mediium can be effected in the same grinding apparatus by the addition of a desired quantity of the liquid medium to the grinding apparatus and then continuing to grind for the desired period of time. If pulverisation is effected by grinding the mixture, the time of grinding is dependent on the intensity of the grinding but we have found that the mixture may be spray-dried satisfactorily by grinding the mixture for times of from 5 minutes up to 10 hours, particularly from 15 minutes up to 5 hours.

An alternative pulverising process which may be used in accordance with the present invention is to subject a suspension of the solid material in the liquid medium simultaneously to vigorous agitation and to a shearing action. This treatment is conveniently effected using an agitation device which is capable of rapid rotation and which includes means for producing a shearing action. The device is desirably capable of rotation at a speed of at least 1000 rpm and conveniently at least 5000 rpm, for example, at 10000 rpm. The shearing action may be achieved by providing spaced, upstanding concentric projections on a disc mounted on the agitator shaft and by also locating similar stationary projections which fit into the gaps between the spaced projections on the agitator shaft. The projections have slots formed therein whereby the liquid medium is drawn through the system as the agitator shaft is rotated. The gap between the rotatable projections and the stationary projections is small and typically does not exceed one millimeter. The high relative motion of the projections on the rotating agitator shaft relative to the stationary projections and the narrow gap between these projections produces a high shearing effect and causes a breakdown of the particles of the solid material. The combined vigorous agitation and shearing action may be achieved using devices which are suitable for emulsifying an oil in a liquid which is immiscible therewith. A suitable device for this purpose is a stirrer of the Ultra Turrax type which is available from Janke and Kunkel KG IKA Werke or a high shear mixer available from Silverson Machines Limited of Chesham, Buckinghamshire, England.

The suspension of the solid material in the liquid medium is pulverised by being subjected to the simultaneous vigorous agitation and shearing for a period of time which is dependent on the device used to effect the simultaneous vigorous agitation and shearing. The time is typically from 10 seconds up to 5 hours, conveniently from 2 minutes up to two hours. Using an Ultra Turrax stirrer the time is typically from 10 seconds up to 1 hour and is conveniently from 1 minute up to 20 minutes very preferably from 2 minutes up to 10 minutes. Using a Silverson high shear mixer, times of from one to two hours are generally necessary. During the simultaneous vigorous agitation and shearing, the mixture is desirably cooled since heat is generated as a consequence of the simultaneous vigorous agitation and shearing and the temperature of the liquid medium can rise quite considerably. The simultaneous vigorous agitation and shearing is conveniently effected using a suspension of the solid material in the liquid medium, where the suspension is initially at ambient temperature.

We have found that the simultaneous vigorous agitation and shearing, in addition to producing heat, may give rise to a dispersion having a high viscosity. Accordingly, it is desirable to use a suspension of the solid material in the liquid medium in which the solid content is not more than 50% by weight of the total weight of the suspension and preferably is not more than 35% by weight of the total weight of the suspension. It is preferred that the suspension contains not less than 5% and preferably at least 15%, by weight of the solid material relative to the total suspension.

We have found that the pulverised mixture may form a gel if not continuously agitated between the end of the pulverising stage and the subsequent treatment stage. Such gel formation is dependent on the liquid medium and any Lewis Base compound which is present, for example if the liquid medium is toluene and the solid material is magnesium chloride which has been ground with ethyl benzoate, we have obtained a gel when the molar ratio of magnesium chloride to ethyl benzoate is 3:1 but the tendency to form a gel is much reduced if the molar ratio is higher, for example 6:1 or 12:1. If a gel is formed, the mixture may be converted to a suspension by adding a further quantity of a liquid medium and agitating the mixture. The further quantity of the added liquid medium may be equal to, or even more than, the volume of the gel.

The mixture obtained by pulverising, before or after treatment with a compound of a transition metal and/or a Lewis Base compound and/or a non-metallic halide, if desired or necessary, is then subjected to a spray-drying step, for example as described in European Patent Application Publication No 0 037 182.

Figure 2:
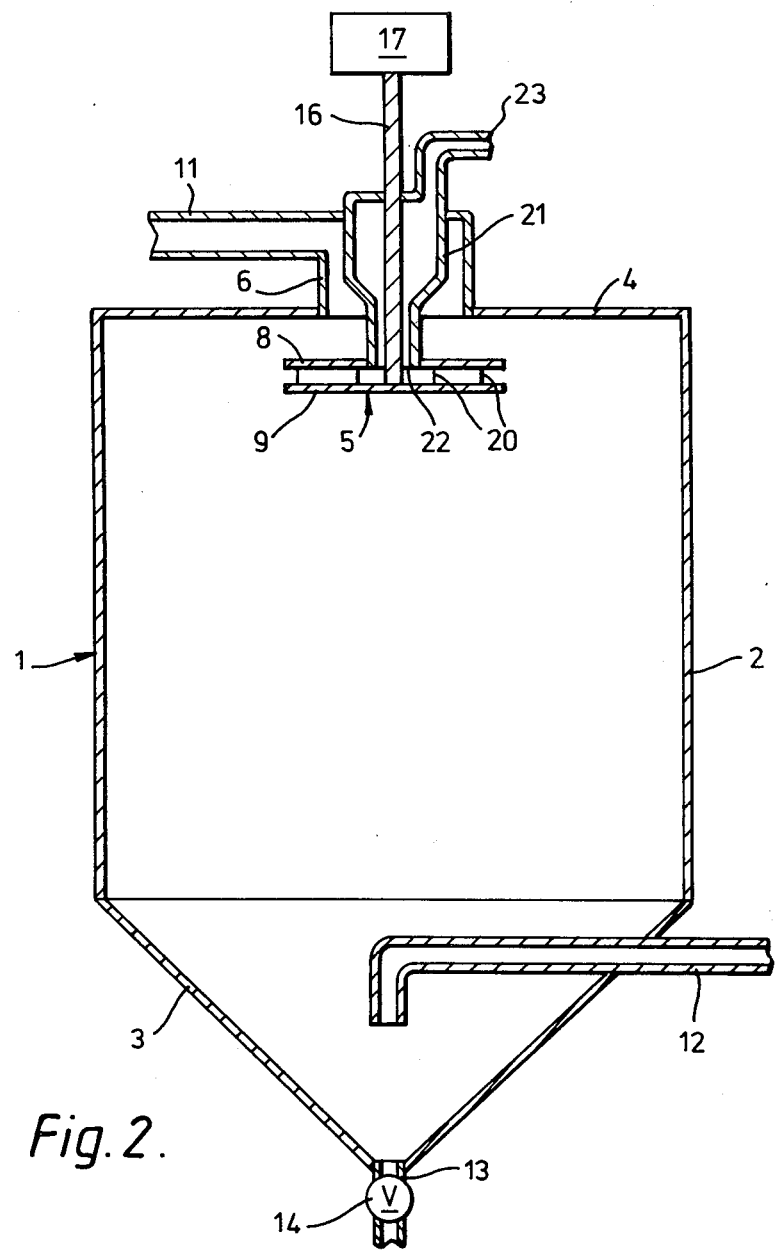

Apparatus which may be used in the spray-drying step of the present invention is illustrated in the accompanying drawings wherein:

in FIG. 1 there is given a cross-sectional elevation of a spray-drying apparatus having an atomising nozzle; and in FIG. 2 there is given a cross-sectional elevation of an alternative spray-drying apparatus having a spinning disc atomizer.

The pulverised mixture of the solid material and the liquid medium, before or after contacting with a compound of a transition metal if required, is spray-dried and the spray-drying can be effected using conventional spray-drying techniques. Thus, the mixture is passed through a suitable atomizer which creates a spray or dispersion of droplets of the mixture, a stream of a hot gas is arranged to contact the droplets and cause evaporation of the liquid medium and the solid product which separates is collected. Suitable atomizers for producing the droplets of the suspension include nozzle atomizers and spinning disc atomizers.

Since, as is well known, the transition metal components of an olefin polymerisation catalyst are sensitive to oxidation, when the solid material is, or contains, a compound of a transition metal the spray-drying stage is preferably effected in an essentially oxygen- and water vapour-free medium. However, if the solid material does not contain a compound of a transition metal, it is not necessary to use an oxygen- and water-free medium although the use of such a medium may be preferred in order to avoid the presence of undesirable materials in the spray-dried product. A suitable gaseous medium for effecting the spray-drying is nitrogen having a high degree of purity, but any othe gaseous medium may be used, particularly one which will have no deleterious effect on the transition metal compound. Thus, alternative gaseous materials which may be used include hydrogen and the inert gases such as argon or helium.

To prevent the ingress of oxygen-containing materials into the spray-drying apparatus, it is preferred to operate at a slightly elevated pressure, for example at about 1.2 kg/cm$^2$ absolute. Although the temperature may be below the boiling temperature of the liquid medium under the pressure conditions which exist within the spray-drying apparatus, the temperature should be such as to cause sufficient evaporation of the liquid medium to dry at least the outer surface of the droplets before they reach the wall, or discharge point, of the spray-drying apparatus.

It is preferred that the temperature at which the spray-drying is effected is relatively low in order to avoid affecting deleteriously those characteristics of the spray-dried solid material which are of importance for a component of an olefin polymerisation catalyst. Hence, particularly if a compound of a transition metal is present, it is preferred that the temperature of the hot gas which is introduced into the spray-drying apparatus does not exceed about 200° C. and is such that the temperature of the droplets, or the spray-dried material, does not exceed 150° C., and preferably the maximum temperature of the droplets, or the spray-dried material, is in the range between 80° C. and 130° C. It will be appreciated that the temperature of the hot gas will be at least equal to the maximum temperature attained by the droplets or spray-dried material.

The hot gas may be arranged to pass in a countercurrent flow to the droplets of the mixture but typically a cocurrent flow of the hot gas and the mixture is used. Using a cocurrent flow, the atomizer is typically located at the top of the spray-drying apparatus and the hot gas is introduced into the top of the apparatus and is removed from near the bottom of the apparatus.

Some of the spray-dried solid collects at the bottom of the apparatus, from which it may be removed, preferably continuously, by suitable means such as a star feeder valve, a screw conveyor, or in the hot gas stream.

The hot gas, which has been cooled by its passage through the spray-drying apparatus may be removed separately from the spray-drying apparatus. The hot gas may be passed through a cyclone to remove entrained solid, and the solid removed in the cyclone may be added to any which is separately removed from the spray-drying apparatus. The vapour of the liquid medium which is present in the hot gas is desirably condensed in a suitable condenser, and the condensed liquid medium can be re-used for mixing with the solid material and subsequent pulverising. The gas may then be reheated and recirculated to the spray-drying apparatus.

The conditions of spray-drying can be adjusted to give any desired particle size and it is preferred that essentially all, that is at least 90% by weight, of the particles of the final spray-dried material are in the range from 5 to 100 microns, particularly between 10 and 80 microns, for example having a mean size of about 30 microns.

Since the spray-dried solid material either can be used as a component of an olefin polymerisation catalyst, or can be used to prepare a component of an olefin polymerisation catalyst, it is desirable that the form of the spray-dried solid material should be such that the olefin polymer obtained has a satisfactory particle form.

It is preferred that the solid material has been subjected to a preliminary treatment in which it is ground with a Lewis Base compound in the essential absence of a liquid medium, thereafter an inert liquid medium is added, the mixture is pulverised and subsequently spray-dried.

Thus, according to a preferred aspect of the present invention, a solid material is ground with a Lewis Base compound in the essential absence of a liquid medium other than the Lewis Base compound, an inert liquid medium is added to the ground material, the material is pulverised to form a dispersion of the solid material in the inert liquid medium, the dispersion is spray-dried and the spray-dried solid material is collected, wherein either (1) the solid material is at least one compound of a transition metal or contains at least one compound of a transition metal, or (2) after the dispersion has been spray-dried, the spray-dried solid material is contacted with at least one compound of a transition metal.

The process of the present invention, together with the preferred optional preliminary grinding stage, may be used as one or more additional stages in catalyst preparations disclosed in the prior art, for example, in British Patent specifications Nos. 1 421 943, 1 485 181, 1 512 730, 1 527 736 and 1 559 194.

The spray-dried solid obtained by the process of the present invention is an agglomerate of the small particles obtained by grinding the mixture of the solid material and the liquid medium. In general, in using the spray-dried solid it will be subjected to shearing forces due to agitation or being circulated through pipe-work, and these shearing forces may cause at least some break-down of the spray-dried solid to smaller particles. To minimize such break-down, it is preferred to incorporate into the spray-dried solid a material which renders the spray-dried solid more resistant to attrition and which may also assist in the agglomeration of the solid particles during the spray-drying step. For convenience hereafter, such a material will be referred to as an "attrition inhibitor".

The attrition inhibitor is conveniently present during the spray-drying stage and is typically present as a solution in the liquid medium in which the solid material is suspended. The attrition inhibitor should be such that, or should be used in an amount such that, it does not have an appreciable adverse effect on the activity and stereospecificity of an olefin polymerisation catalyst system which includes a solid material obtained by the process of the present invention. If the material obtained by the use of a spray-drying step is subsequently to be suspended in a liquid medium, the attrition inhibitor preferably should be such as to least minimise dispersion of the spray-dried solid material into smaller particles in the presence of the liquid medium in which the solid is to be suspended. Hence, the attrition inhibitor is preferably soluble in the liquid medium used for the spray-drying step but is insoluble, or of low solubility, in any liquid medium in which the solid is suspended after effecting the spray-drying step.

The attrition inhibitor may be, for example, polystyrene, polymethylmethacrylate, polyvinylacetate, atactic polypropylene, or an AB block copolymer for example of t-butylstyrene-styrene. It will be appreciated that not all attrition inhibitors will be equally effective. The use of an attrition inhibitor during the spray-drying of the suspension can result in the spray-dried solid material being in the form of firmer agglomerates than a similar spray-dried solid material obtained without using an attrition inhibitor. The amount of the attrition inhibitor is preferably from 0.5% up to 10% by weight relative to the solid material present in the suspension. The suspension containing the attrition inhibitor is spray-dried using conventional spray-drying techniques, for example such as are described in our European Patent Application Publication No 0 037 182.

Whilst the attrition inhibitor may be present during the pulverising of the mixture of the solid material and the liquid medium, it may also be added at the completion of the pulverising and before effecting the spray-drying step.

The product obtained by the process of the present invention may be used together with an organic compound of a non-transition metal to give a polymerisation catalyst system.

Thus, as a further aspect of the present invention there is provided a polymerisation catalyst which is the product obtained by mixing together (1) a transition metal composition which is the spray-dried product obtained by the process of the present invention; and
(2) an organic compound of aluminium or of a metal of group IIA of the Periodic Table or a complex of an organic compound of a metal of Group IA or Group IIA of the Periodic Table together with an organic aluminium compound.

The transition metal composition which is Component 1 of the catalyst system is a spray-dried transition metal composition obtained in the manner hereinbefore described.

Component 2 of the catalyst may be an organic magnesium compound such as, for example, a dihydrocarbyl magnesium compound, a hydrocarbyl magnesium halide compound, or an alkoxy magnesium compound preferably one containing an alkyl group in addition to an alkoxy group. Alternatively, a complex of a magnesium compound with an aluminum compound may be used for example a complex of a magnesium alkyl with an aluminum alkyl.

Component 2 may be a complex of a metal of Group IA with an organic aluminium compound, for example, a compound of the type lithium aluminium tetraalkyl.

Preferably Component 2 is an organic aluminium compound which may be, for example, an aluminium hydrocarbyl sulphate, or an aluminium hydrocarbyl hydrocarbyloxy or, more preferably, an aluminium hydrocarbyl halide such as a dihydrocarbyl aluminium hydrocarbyl halide such as a dihydrocarbyl aluminium halide or particularly preferred are aluminium trihydrocarbyl compounds or dihydrocarbyl aluminium hydrides. The espicially preferred aluminium compounds are aluminium trialkyls particularly those in which the alkyl group contains from 2 up to 10 carbon atoms, for example, aluminium triethyl, aluminium tri-isobutyl and aluminium trioctyl.

The catalyst system may consist of only two components, particularly if the monomer being polymerised is ethylene or contains a substantial proportion of ethylene, for example, sufficient to give a polymer containing at least 70% by weight of ethylene. However, if Component 2 of the catalyst system is an aluminium trihydrocarbyl compound, and the catalyst system is to be used to polymerise a higher olefin monomer such as propylene, it is preferred that the catalyst system also includes a Lewis Base compound. The Lewis Base compound which may be used as a further component of the catalyst system can be any Lewis Base compound of the type disclosed herein as being suitable for use in the production of the transition metal composition which is subjected to pulverisation and spray-drying in accordance with the present invention.

Particularly preferred Lewis Base components for use as a further component of the catalyst system are esters and organic silicon compounds, such as the esters of carboxylic acids which contain an aromatic group, for example, ethyl benzoate, butyl benzoate, methyl p-methylbenzoate, ethyl p-methoxybenzoate, and ethyl phenylacetate and also dialkyl phthalates and phenyl alkoxysilanes.

In addition to, or instead of, the Lewis Base compound which may be present as a further component of the catalyst system, there may also be present in the catalyst system a substituted or unsubstituted polyene, which may be an acyclic polyene such as 3-methylheptatriene (1,4,6), or a cyclic polyene such as cyclooctatriene, cyclooctatetraene, or cycloheptatriene, or the alkyl- or alkoxy-substituted derivatives of such cyclic polyenes, or the the tropylium salts or complexes, or tropolone or tropone.

The proportions of Components 1 and 2 of the catalyst system can be varied within a wide range as is well known to the skilled worker. The particular preferred proportions will be dependent on the type of materials used and the absolute concentrations of the components but, in general, we prefer that for each gramme atom of the transition metal which is present in Component 1 of the catalyst system there is present at least one mole of Component 2. The number of moles of Component 2 for each gramme atom of the transition metal in Component 1 may be as high as 1000 but conveniently does not exceed 500 and with some transition metal compositions may be not more than 25, for example, from 5 up to 10.

When the catalyst system includes a Lewis Base component as a further component of the catalyst system, it is preferred that this Lewis Base compound is present in an amount of not more than 1 mole for each mole of Component 2 and particularly in an amount of from 0.1 up to 0.5 moles of the Lewis Base compound for each mole of Component 2. However, depending on the particular organic metal compound and Lewis Base compound, the proportion of the Lewis Base compound may need to be varied in order to achieve the optimum catalyst system.

If the catalyst system includes a polyene, it is preferred that the polyene is present in an amount of not more than 1 mole for each mole of Component 2, and especially from 0.01 up to 0.20 moles for each mole of Component 2. If the catalyst system includes both the Lewis Base component and the polyene, it is preferred that both of these materials are present together in an amount of not more than 1 mole for each mole of Component 2.

Catalyst systems in accordance with the present invention are suitable for the polymerisation and copolymerisation of unsaturated monomers, particularly ethylenically unsaturated hydrocarbon monomers such as the olefin monomers.

Thus, as a further aspect of the present invention, there is provided a process for the production of a polymer or copolymer of an unsaturated monomer wherein at least one ethylenically unsaturated hydrocarbon monomer is contacted under polymerisation conditions with a polymerisation catalyst as hereinbefore defined.

The monomer which may be contacted with the catalyst system is conveniently one having the following formula:

$$CH_2=CHR^1$$

wherein $R^1$ is a hydrogen atom or a hydrocarbon radical.

Thus, the monomer may be ethylene, propylene, butene-1, pentene-1, hexene-1, 4-methylpentene-1, styrene, 1,3-butadiene or any other monomer which satisfies the foregoing formula. The monomer is preferably an olefin monomer, particularly an aliphatic mono-olefin monomer containing not more than 10 carbon atoms.

The monomers may be homopolymerised or may be copolymerised together. If propylene is copolymerised it is preferred to effect the copolymerisation with ethylene, conveniently using a sequential copolymerisation process as is described in British Pat. Nos. 970 478; 970 479 and 1 014 944. If ethylene is being copolymerised using the process of the present invention, it is preferred to carry out the copolymerisation using a mixture of ethylene and the desired comonomer, for example butene-1 or hexene-1, wherein the mixture of monomers has essentially the same composition throughout the polymerisation process.

Component (1) of the catalyst may be mixed with the other component, or components, of the catalyst in the presence of the olefin monomer. If the catalyst includes a Lewis Base compound, it is preferred to premix the organic metal compound which is component (2) with the Lewis Base compound and then to mix this pre-mixture with the reaction product which is component (1).

As is well known, Ziegler-Natta type catalysts are susceptible to the presence of impurities in the polymerisation system. Accordingly, it is desirable to effect the polymerisation using a monomer, and a diluent if this is being used, which has a high degree of purity, for example a monomer which contains less than 5 ppm by weight of water and less than 1 ppm by weight of oxygen. Materials having a high degree of purity can be obtained by processes such as those described in British Patent Specification Nos. 1 111 493; 1 226 659 and 1 383 611.

Polymerisation can be carried out in the known manner, for example in the presence or absence of an inert diluent such as a suitably purified paraffinic hydrocarbon, in the liquid phase using an excess of the liquid monomer as the polymerisation medium or in gas phase, this latter term being used herein to mean the essential absence of a liquid medium.

If polymerisation is effected in gas phase, it may be effected by introducing the monomer, for example propylene, into the polymerisation vessel as a liquid and operating with conditions of temperature and pressure within the polymerisation vessel which is such that the liquid monomer vaporises, thereby giving an evaporative cooling effect, and essentially all of the polymerisation occurs with a gaseous monomer. Polymerisation in gas phase may be effected using conditions which are such that the monomer is at a temperature and partial pressure which are close to the dew point temperature and pressure for that monomer, for example as described in more detail in British Patent Specification No. 1 532 445. Polymerisation in gas phase can be effected using any technique suitable for effecting a gas-solid reaction such as a fluidised-bed reactor system, a stirred-bed reactor system or a ribbon blender type of reactor.

Using the catalyst system of the present invention, ethylene may be polymerised or copolymerised, for example with butene-1 as the comonomer, in a fluidised-bed reactor system to give a high yield of polymer. The fluidising gas is the gas mixture to be polymerised together with any hydrogen which is present as a chain transfer agent to control molecular weight. Thus, for the copolymerisation of ethylene and butene-1 to produce an ethylene copolymer having a density of less than about 940 kg/m$^3$, the gas composition is typically from 50 to 60 mole % ethylene, 15 to 25 mole % butene-1 with the remainder, apart from inert materials and impurities, being hydrogen.

Polymerisation may be effected either in a batch manner or on a continuous basis, and the catalyst components may be introduced into the polymerisation vessel separately or all the catalyst components may be mixed together before being introduced into the polymerisation reactor. If all of the catalyst components are premixed, this pre-mixing is preferably effected in the presence of a monomer and such pre-mixing will result in at least some polymerisation of this monomer before the catalyst system is introduced into the polymerisation vessel. If the polymerisation is being carried out in the gas phase, the catalyst components may be added to the pollymerisation reactor suspended in a stream of the gaseous monomer or monomer mixture.

The polymerisation can be effected in the presence of a chain transfer agent such as hydrogen or a zinc dialkyl, in order to control the molecular weight of the product formed. If hydrogen is used as the chain transfer agent in the polymerisation of propylene, it is conveniently used in an amount of from 0.01 up to 5.0%, particularly from 0.05 up to 2.0% molar relative to the monomer. When the monomer being polymerised is ethylene, or a mixture in which ethylene is a major polymerisable component (by moles), the amount of hydrogen used may be greater, for example, in the homopolymerisation of ethylene the reaction mixture may contain in excess of 50% molar of hydrogen, whereas if ethylene is being copolymerised, a proportion of hydrogen which is typically up to 35% molar is used. The amount of chain transfer agent will be dependent on the polymerisation conditions, especially the temperature, which, at polymerisation pressures not exceeding 50 kg/cm$^2$, is typically in the range from 20° C. up to 100° C., preferably from 50° C. up to 85° C.

Polymerisation can be effected at any pressure which has been previously proposed for effecting the polymerisation of monomers such as olefin monomers. However, although the polymerisation may be effected at pressures up to 3000 kg/cm$^2$, at which pressures the polymerisation temperature may be as high as 300° C., it is preferred to carry out the polymerisation at relatively low pressures and temperatures. Whilst the polymerisation may be effected at atmospheric pressure, it is preferred to use a slightly elevated pressure and thus it is preferred tha the polymerisation is effected at a pressure of from 1 kg/cm$^2$ up to 50 kg/cm$^2$, preferably from 5 up to 30 kg/cm$^2$. The polymerisation temperature is preferably above ambient temperature and typically will not exceed 100° C.

Referring to FIG. 1 of the accompanying drawings, a gas-tight spray-drying vessel 1 comprises an upper cylindrical section 2 and a lower, generally conical section 3. The upper section 2 is provided with a cover plate 4. An atomizer nozzle assembly 5 is located within a plenum chamber 6, the plenum chamber 6 being mounted on the cover plate 4. The atomizer nozzle assembly 5 contains an inner conduit 7 and an outer conduit 8. The conduit 7 is a continuation of a conduit 9, which is connected to a source (not shown) of a suspension containing a pulverised mixture of a solid material and a liquid medium. Conduit 8 is connected to a source (not shown) of an inert gas. The conduits 7 and 8 are essentially co-axial and are tapered at their lower ends. The nozzle assembly 5 is provided at its lower end with an orifice 10 formed by openings in both of conduits 7 and 8. A conduit 11 is connected to the plenum chamber 6 and also to a source (not shown) of a heated inert gas.

Near the bottom of the vessel 1 is located a conduit 12 which passes out of the vessel 1 through the side of the conical section 3. A conduit 13, in which is located a valve means 14, is connected to the bottom of the conical section 3 and is also connected to a hopper (not shown) for storing dry solid.

In operation, the gas flow through the conduit 8 draws the suspension through the conduits 9 and 7. The gas and the suspension pass through the orifice 10 and form a spray of droplets. Hot inert gas which passes through conduit 11 and plenum chamber 6 flows past the orifice 10 and causes evaporation of the liquid medium from the droplets of the suspension. The inert gas containing the vaporised liquid medium and some entrained spray-dried solid, passes out of the vessel 1 through the conduit 12. The major portion of the spray-dried solid collects at the bottom of the conical section 3 from which it is withdrawn through the conduit 13 by operation of the valve means 14.

The inert gas passed through the conduit 11 is conveniently nitrogen at a temperature in the range 130° to 150° C.

The apparatus shown in FIG. 2 is essentially the same as that shown in FIG. 1 with the exception that the atomizer nozzle is replaced by a disc atomizer. In FIG. 2, the corresponding parts are indicated by the same reference numbers as in FIG. 1.

A disc atomizer 15 mounted on the end of an output shaft 16 of a high speed gear box/motor assembly 17 is located near the top of the vessel 1. The disc 15 consists of two plates 18 and 19 between which are secured a series of radial vanes 20. A chamber 21 surrounds the drive shaft 16 and extends to the upper plate 18 of the disc 15. The plate 18 is provided with a central opening indicated at 22.

The plenum chamber 16 surrounds the chamber 21. A conduit 23 is connected to the chamber 21 and also to a source (not shown) of a suspension containing a solid material.

In operation, the disc 15 is rotated at a high speed in the range from 500 up to 25,000 rpm. A suspension which is a pulverised mixture of a solid material and an inert liquid medium, for example a magnesium chloride-ethyl benzoate product in toluene, is passed through the conduit 23 and chamber 21 into the space between the plates 18 and 19 of the disc 15. The high speed of rotation of the disc 15, and the vanes 20, cause the suspension to pass to the periphery of the disc 15 from which the suspension is flung off as a spray of droplets.

A hot inert gas is passed through the conduit 11, and plenum chamber 6 to flow round the rotating disc 15. The hot inert gas causes evaporation of the liquid medium from the droplets of the suspension.

The inert gas containing the vaporised liquid medium and some entrained spray-dried solid, passes out of the vessel 1 through the conduit 12. The major portion of the spray-dried solid collects at the bottom of the conical section 3 from which it is withdrawn through the conduit 13 by operation of the valve means 14.

The inert gas passing through the conduit 12 may be passed to a cyclone (not shown) to recover entrained solid, then to a condenser (not shown) to recover the liquid vapour and finally to a re-heater (not shown). The reheated inert gas is then recirculated to the conduit 11. The spray-dried solid passing through the conduit 13 is passed to a storage hopper (not shown).

Other alternative arrangements and spray-drying techniques will be apparent to the skilled worker and may be used without departing from the scope of the present invention as defined herein.

Various aspects of the present invention will now be described with reference to the following Examples which are illustrative of the invention. In the Examples, all operation are effected under an atmosphere of nitrogen unless otherwise indicated. All the glass apparatus was dried in an air oven at 120° C. for at least one hour and purged with nitrogen.

Examples 1 to 9 illustrate the incorporation of the process of the present invention into the preparation of a transition metal composition carried out in accordance with our copending British Patent application No. 2,103,627A entitled "Transition Metal Composition, Production and Use". In Examples 1 to 10, pulverisation was effected by grinding in a ball mill.

EXAMPLE 1

(A) Milling magnesium chloride and ethyl benzoate

A Siebtechnik SM 6 Vibromill chamber having a total usable volume of about 1.5 dm$^3$ and containing 180 stainless steel balls of 25 mm diameter was sealed, evacuated to a pressure of $0.3 \times 10^{31\ 3}$ kg/cm$^2$, and purged with nitrogen to give a nitrogen atmosphere in the mill. A mixture of water and ethylene glycol at 0° C. was passed through the jacket of the mill and the mill was vibrated at a frequency of 1500 oscillations per minute and an amplitude of 2 mm. 182 grammes of essentially anhydrous magnesium chloride (BDH technical grade) was incorporated into the mill chamber whilst the mill was being vibrated. After the addition of the magnesium chloride, the mill was vibrated for about 15 minutes and 91 cm$^3$ of ethyl benzoate was then added to the vibrating mill over a period of about 5 minutes. The mill was then vibrated for a further 24 hours whilst continuing to pass the mixture of water and ethylene glycol at 0° C. through the jacket of the mill.

(B) Milling with toluene

After 24 hours, 500 cm$^3$ of toluene was added to the mill chamber whilst continuing to vibrate the mill. Milling was continued in the presence of the added toluene at 0° C. for a further three hours.

After three hours, the mill was inverted, the inverted mill was vibrated and the milled magnesium chloride-ethyl benzoate was collected under nitrogen. The mill chamber was washed out with 800 cm$^3$ of toluene which was added to the suspension previously removed. The molar ratio of magnesium chloride to ethyl benzoate in the mill was about 3 to 1.

To the milled mixture, which was being stirred, was added a 10% weight/volume solution of polystyrene ("Styron" 686/7—available from Dow Chemical Company) in toluene to provide 2% by weight of polystyrene relative to the milled magnesium chloride—ethyl benzoate.

After standing overnight, the mixture had set solid and it was necessary to add a further quantity of toluene, add to agitate the mixture, in order to resuspend the solid particles. The diluted mixture had a solid content of about 15% by weight.

(C) Spray drying magnesium chloride/ethyl benzoate suspension

All of the suspension obtained in step (B) was spray-dried using a glass laboratory scale spray drying apparatus similar to that illustrated in FIG. 1 of the accompanying drawings and previously described herein. The spray drying apparatus had a diameter of 15 cm and a length of 0.7 meters, the conical section 3 was replaced by a generally hemispherical bottom section, the conduit 12 was omitted, the valve 14 in the conduit 13 was omitted and the conduit 13 was connected directly to a cyclone provided with a catch-pot in which the solid material was collected. The spray nozzle used was a ¼ JAU Automatic Air Atomizing Nozzle obtained from Spraying Systems Co. of the USA and having a 0.72 mm diameter nozzle.

Spraying was effected under nitrogen by passing a stream of nitrogen, preheated to a temperature of 140 to 150° C., through conduit 11 at a rate of 170 to 180 dm$^3$/minute. Nitrogen at a pressure of about 2.3 kg/cm$^2$ absolute was introduced into the spray nozzle. The suspension obtained in step (B) was fed from a stirred storage flask to the spray nozzle by the application of an excess nitrogen pressure of 0.25 kg/cm$^2$ to the storage flask (that is the total pressure in the storage flask was about 1.28 kg/cm$^2$) absolute.

(D) Contacting with titanium tetrachloride

A sample (96 grammes) of the spray dried product from stage (C) was transferred to a 1.8 dm$^3$ jacketted glass vessel which was provided with a stirrer. One dm$^3$ of titanium tetrachloride was added to the vessel, the stirrer was started and heating was applied to the jacket. Heating was continued until a temperature of 100° C. was attained, which took 0.5 hours. The temperature was maintained at 100° C., and stirring was continued, for three hours. At the end of three hours, the stirrer was stopped and the solid was allowed to settle whilst continuing to heat the contents of the vessel. 4.0 hours after terminating the stirring, the supernatant liquid was siphoned off from the settled solid. The heating was switched off and the contents of the vessel allowed to cool by standing overnight.

The contacting with the titanium tetrachloride was repeated by adding one dm$^3$ of titanium tetrachloride to the cold residue remaining from the previous contacting, the conditions of treatment being as previously described.

(E) Washing

To the residue remaining from stage (D) was added a sufficient quantity of a heptane fraction, at least 90% of which is n-heptane (hereafter referred to as the "n-heptane fraction"), at ambient temperature to give a total volume of 1.5 dm$^3$. The mixture was stirred and heated up to reflux temperature (about 100° C.). Stirring at reflux temperature was continued for an hour and then ceased. After a further 2.5 hours, the supernatant liquid was siphoned off from the settled solid whilst still heating.

Heating was ceased and a sufficient quantity of the n-heptane fraction at ambient temperature was added to the hot residue to give a total volume of 1.5 dm$^3$ at a temperature of about 45° C. The mixture was stirred without heating for 15 minutes. The stirrer was switched off and the solid allowed to settle. After 1.25 hours, the supernatant liquid was siphoned off from the settled solid.

To the residue remaining from the previous washing step was added a sufficient quantity of the n-heptane fraction at ambient temperature to give a total volume of 1.5 dm$^3$ at ambient temperature. The mixture was stirred for 15 minutes without heating and allowed to settle. After 1.25 hours, the supernatant liquid was siphoned off from the settled solid.

The cold residue remaining from the third washing step was diluted with the n-heptane fraction to give a final volume of 1.0 dm$^3$ and the mixture was transferred to a storage vessel under nitrogen.

EXAMPLE 2

The procedure of Example 1 was repeated with the changes noted hereafter.

In stage (A), 255 grammes of magnesium chloride and 32 cm$^3$ of ethyl benzoate were used. The molar ratio of magnesium chloride to ethyl benzoate was about 12 to 1.

In stage (B), 400 cm$^3$ of toluene were used and the mixture was milled for 0.5 hours. The mill chamber was washed out with 300 cm$^3$ of toluene. The mixture was allowed to stand overnight, without adding any polystyrene, and the mixture was still fluid the following morning. The polystyrene solution was added, whilst stirring the mixture, to provide 1.5% by weight of polystyrene relative to the milled magnesium chloride-ethyl benzoate.

In stage (C), the heated nitrogen was passed at a rate of 190 dm$^3$/minute. Nitrogen at a pressure of about 1.25 kg/cm$^2$ absolute was introduced into the spray nozzle. The excess pressure applied to the storage flask was 0.14 kg/cm$^3$.

In stage (D), an 800 cm$^3$ jacketted glass vessel with a stirrer was used. 25.5 grammes of the spray-dried product from stage (C) were used and 255 cm$^3$ of titanium tetrachloride for each treatment with titanium tetrachloride. At the end of the second treatment with titanium tetrachloride, the solid was allowed to settle for 1.5 hours, the supernatant liquid was removed but the mixture was not allowed to cool.

In stage (E), four washing steps were effected and each washing step was effected using 300 cm$^3$ of an aliphatic hydrocarbon consisting essentially of dodecane isomers and having a boiling point in the range 170° C. to 185° C. (hereafter referred to simply as the "aliphatic hydrocarbon"). The first and second washes were effected by heating the mixture up to 100° C. and stirring at this temperature for one hour. The first wash was effected by adding the aliphatic hydrocarbon to the hot residue remaining after the second treatment with titanium tetrachloride. The second wash was effected by adding the aliphatic hydrocarbon to the hot residue remaining after the first wash. Heating was terminated after the second wash and the third wash was effected by adding the aliphtic hydrocarbon to the hot residue from the second wash and stirring for 15 minutes without heating. After removing the supernatant liquid from the third wash, the mixture was allowed to cool overnight and the fourth was effected on the cold residue of the third wash. The residue was diluted to give a final volume of 255 cm$^3$ using the aliphatic hydrocarbon.

EXAMPLE 3

The procedure of Example 2 was repeated with the changes noted hereafter.

In stage (A), 207 grammes of magnesium chloride and 52 cm$^3$ of ethyl benzoate were used. The molar ratio of magnesium chloride to ethyl benzoate was about 6 to 1.

In stage (B), the mill chamber was washed out with 200 cm$^3$ of toluene. After standing overnight, the mixture was still fluid but was viscous. After adding the polystyrene solution, a further 100 cm$^3$ of toluene were added.

In stage (C), nitrogen at a pressure of about 1.35 kg/cm$^2$ absolute was introduced into the spray nozzle.

In stage (D), 25 grammes of the spray-dried product from stage (C) were used and 250 cm$^3$ of titanium tetrachloride for each treatment with titanium tetrachloride.

In each titanium tetrachloride treatment, the solid was allowed to settle for about one hour before the supernatant liquid was siphoned off.

In stage (E), the washings were effected using the n-heptane fraction. The residue was allowed to cool overnight after the first hot wash. The second hot wash was effected and the two cold washes were effected in succession directly after the second hot wash. The residue was diluted to give a final volume of 250 cm$^3$ using the n-heptane fraction.

EXAMPLE 4

The procedure of Example 3 was repeated with the changes noted hereafter.

In stage (A), 196 grammes of magnesium chloride and 62 cm$^3$ of ethyl benzoate were used. The molar ratio of magnesium chlorie to ethyl benzoate was about 4.8 to 1.

In stage (B), after adding the polystyrene solution, a further 200 cm$^3$ of toluene were added.

In stage (C), the preheated nitrogen was at a temperature of 140° C. and the excess pressure applied to the storage flask was 0.05 kg/cm$^2$.

In stage (D), 28 grammes of the spray-dried product from stage (C) were used and 280 cm$^3$ of titanium tetrachloride for each treatment with titanium tetrachloride.

In stage (E), 330 cm$^3$ of the n-heptane fraction were used for each washing stage. The residue was diluted to a final volume of 280 cm$^3$ using the aliphatic hydrocarbon.

EXAMPLE 5

The procedure of Example 3 was repeated with the changes noted hereafter.

In stage (A), 236 grammes of magnesium chloride and 78 cm$^3$ of ethyl benzoate were used. The molar ratio of magnesium chloride to ethyl benzoate was 4.6 to 1.

In stage (B), the mill chamber was washed out with 340 cm$^3$ of toluene. The polystyrene solution and a further 265 cm$^3$ of toluene were added whilst stirring and this mixture was allowed to stand overnight without stirring. In the morning, the mixture was very viscous and a further 300 cm$^3$ of toluene were added to the mixture whilst stirring.

In stage (C), the preheated nitrogen was at a temperature of 140° C.

In stage (D), 28.5 grammes of the spray-dried product from stage (C) were used and 285 cm$^3$ of titanium tetrachloride for each treatment with titanium tetrachloride. The second treatment with titanium tetrachloride was effected directly after the first treatment, without allowing the residue to cool. After the second titanium tetrachloride treatment, the residue was allowed to cool overnight.

In stage (E), the washings were effected using 340 cm$^3$ of the aliphatic hydrocarbon for each wash. Each washing was effected directly after the previous washing. The residue was diluted to a final volume of 285 cm$^3$ using the aliphatic hydrocarbon.

EXAMPLE 6

The procedure of Example 3 was repeated with the changes noted hereafter.

In stage (A), 205 grammes of magnesium chloride and 63 cm$^3$ of ethyl benzoate were used. The molar ratio of magnesium chloride to ethyl benzoate was about 4.9 to 1.

In stage (B), the mill chamber was washed out with 300 cm$^3$ of toluene. The polystyrene solution was added to provide 1% by weight of polystyrene relative to the milled magnesium chloride - ethyl benzoate. No further toluene was added.

In stage (C), the preheated nitrogen was at a temperature of 135° C. to 138° C., the excess pressure applied to the storage flask was 0.07 kg/cm$^2$ and about one fifth of the mixture was spray-dried.

In stage (D), 24 grammes of the spray-dried product from stage (C) were used and 240 cm$^3$ of titanium tetrachloride for each treatment with titanium tetrachloride.

In stage (E), the washings were effected using 360 cm$^3$ of the aliphatic hydrocarbon for each wash. The residue was diluted with the aliphatic hydrocarbon.

EXAMPLE 7

After the spray-drying one fifth of the suspension in stage (C) of Example 6, a further quantity of the polystyrene solution was added to the remaining suspension to provide 2% by weight of polystyrene relative to the milled magnesium chloride - ethyl benzoate and about a further one fifth of the original suspension was spray-dried using the conditions as in stage (C) of Example 6. A further quantity of the polystyrene solution was then added to the remaining suspension to provide 4% by weight of polystyrene relative to the milled magnesium chloride - ethyl benzoate. This suspension was then spray-dried (about one fifth of the original suspension) using the conditions as in stage (C) of Example 6.

28 grammes of the product spray-dried in the presence of 4% by weight of polystyrene was treated with titanium tetrachloride and washed as in stages (D) and (E) of Example 6 with the exception that 280 cm$^3$ of titanium tetrachloride and 420 cm$^3$ of the aliphatic hyrocarbon were used and the residue was diluted to a volume of 290 cm$^3$.

EXAMPLE 8

The procedure of Example 3 was repeated with the changes noted hereafter.

In stage (A), 212.4 grammes of magnesium chloride, 53.5 cm$^3$ of ethyl benzoate and 53.5 cm$^3$ of toluene were used. The molar ratio of magnesium chloride to ethyl benzoate was about 6 to 1.

In stage (B), the mill chamber was washed out with 300 cm$^3$ of toluene. The total suspension was split into two approximately equal portions. To one portion of the suspension was added the polystyrene solution to provide 2% by weight of polystyrene relative to the milled magnesium chloride - ethyl benzoate. The suspension was diluted with a sufficient quantity of toluene to give a final suspension having a 25% by weight solid content.

In stage (C), nitrogen at a pressure of about 1.42 kg/cm$^2$ absolute was introduced into the spray nozzle and the excess pressure applied to the storage flask was 0.2 to 0.25 kg/cm$^2$. The spray nozzle was located at the bottom of the spray drying apparatus and the hot nitrogen was introduced into the top of the spray drying apparatus so that the spraying was in an upward direction against a counter-current of hot nitrogen.

In stage (D), 30 grammes of the spray-dried product from stage (C) were used and 300 cm$^3$ of titanium tetrachloride for each treatment with titanium tetrachloride.

In stage (E), washing was effected using 350 cm$^3$ of the aliphatic hydrocarbon for each wash. The residue was not allowed to cool after the first hot wash, the second hot wash was effected directly after the first hot wash and the residue was allowed to cool overnight after the second hot wash. The cold washes were carried out on the cold residue of the second hot wash. The residue was diluted to a final volume of 300 cm$^3$ using the aliphatic hydrocarbon.

EXAMPLE 9

The remaining portion of the milled suspension obtained in stage (B) of Example 8 was used. To this remaining portion was added a 10% weight/volume solution in toluene of polymethylmethacrylate (MH 254 grade - available from Imperial Chemical Industries PLC). The polymethylmethacrylate solution was added to provide 2.0% by weight of polymethylmethacrylate relative to the milled magnesium chloride - ethyl benzoate. This suspension was diluted with toluene to give a final suspension having a 25% by weight solid content.

The suspension obtained was then spray-dried, treated with titanium tetrachloride, washed and diluted as in stages (C), (D) and (E) of Example 8.

EXAMPLE 10

The procedure of Example 3 was repeated with the changes noted hereafter.

In stage (A), 214.3 grammes of magnesium chloride, 16.9 grammes of ethyl benzoate and 16 cm$^3$ of toluene were added to the mill. The molar ratio of magnesium chloride to ethyl benzoate was 20 to 1.

In stage (B), the mill chamber was washed out with 300 cm$^3$ of toluene. To the suspension was added 46 cm$^3$ of a 10% weight/volume solution in toluene of polymethylmethacrylate (as in Example 9) followed by 200 cm$^3$ of toluene.

In stage (C), nitrogen at a pressure of about 1.45 kg/cm$^2$ was introduced into the spray nozzle. The excess pressure applied to the storage flask was 0.05 kg/cm$^2$.

In stage (D), 29.5 grammes of the spray-dried product from stage (C) were used. Only one treatment with titanium tetrachloride was effected. The amount of titanium tetrachloride was 295 cm$^3$, the solid was allowed to settle for 2 hours 40 minutes before the supernatant liquid was siphoned off and the residue was allowed to cool overnight.

In stage (E), the aliphatic hyrocarbon was used. To the residue was added 350 cm$^3$ of the aliphatic hydrocarbon, the mixture was heated to 100° C. and maintained at that temperature for one hour. The solid was allowed to settle for 2 hours 20 minutes, the supernatant was siphoned off and the heating was switched off. Three further washes were effected by adding 350 cm$^3$ of the aliphatic hydrocarbon at ambient temperature to the residue from the previous washing. The mixture was stirred for 15 minutes and allowed to settle, for one hour in the second and third washing steps and overnight for the final washing step. The residue was diluted to give a final volume of 300 cm$^3$ using the aliphatic hydrocarbon.

EXAMPLES 11 TO 21

Polymerisation was carried out in an 8 dm$^3$ stainless steel autoclave.

3 dm$^3$ of the aliphatic hyrocarbon were charged into the autoclave and degassed at 70° C. for 15 minutes at a pressure of 0.07 kg/cm$^2$ absolute. Propylene was then admitted to the vessel in an amount to give a pressure of 1.1 kg/cm$^2$ absolute. The aliphatic hydrocarbon was stirred and stirring was continued throughout the following procedures. 20 millimole of aluminium triisobutyl were added to the autoclave as a 25% by weight solution in the aliphatic hydrocarbon. 7 millimoles of methyl p-methylbenzoate were then added to the autoclave as a solution in the aliphatic hydrocarbon. A quantity of a suspension of a spray-dried magnesium chloride supported titanium halide composition obtained in one of Examples 1 to 10 was then added.

The autoclave was maintained at 70° C. while propylene was passed into the autoclave to achieve a pressure of 11.5 kg/cm² absolute. 10 millimoles of hydrogen were then added. The pressure was maintained at 11.5 kg/cm² absolute by feeding propylene. After 0.5 hour, and again after one hour, further 10 millimole quantities of hydrogen were added to the autoclave. After 2 hours, the propylene feed was terminated and the autoclave was vented to atmospheric pressure. The polymer suspension was passed into a receptacle and the polymer was filtered off in air. A sample of the polymer was dried at 100° C. in a fluidized bed using nitrogen as the fluidising gas.

Further details of the polymerisation conditions, and the properties of the products obtained, are given in Table One.

TABLE ONE

| Ex (a) | Ti Compn. Type (b) | Amount (cm³) (c) | MFI (d) | FM (e) | Ti (f) | Al (f) | Cl (f) | PD (g/l) (h) |
|---|---|---|---|---|---|---|---|---|
| 11 | 1 | 3 | 10.4 | 1.45 | 9 | 457 | 280 | 339 |
| 12* | 2 | 4 | 23.0 | 1.42 | 9 | 293 | 220 | ND |
| 13 | 3 | 4 | 7.0 | 1.43 | 5 | 285 | 195 | 390 |
| 14** | 4 | 4 | 5.3 | 1.35 | 6 | 303 | 215 | ND |
| 15 | 5 | 4 | 13.5 | 1.45 | 7 | 217 | 225 | 411 |
| 16 | 6 | 4 | 13.1 | 1.42 | 8 | 216 | 238 | 413 |
| 17 | 7 | 4 | 18.2 | 1.55 | 6 | 271 | 238 | 407 |
| 18 | 8 | 4 | 17.7 | 1.60 | 15 | 312 | 433 | 404 |
| 19 | 8 | 4 | 23.1 | 1.51 | 11 | 256 | 369 | 390 |
| 20 | 9 | 4 | 29.5 | 1.56 | 6 | 206 | 311 | 422 |
| 21 | 10 | 4 | 49.7 | 1.62 | 16 | 260 | 307 | 364 |

Notes to Table One
(a) *In this polymerisation, the pressure was maintained at 12.2 kg/cm² absolute.
**In this polymerisation, the pressure was maintained at 11.9 kg/cm² absolute.
(b) Type refers to the Example in which the production of the titanium composition is described.
(c) Amount is the volume of suspension added.
(d) MFI is melt flow index measured by ASTM Test Method D 1238/70, Condition N (190° C. and 10 kg).
(e) FM is the flexural modulus expressed in GN/m². The flexural modulus was measured using a cantilever beam apparatus as described in Polymer Age, March 1970, pages 57 and 58. The deformation of a test strip at 1% skin strain after 60 seconds at 23° C. and 50% relative humidity was measured. The test strip, which had dimensions of approximately 150 × 19 × 1.6 mm, was prepared in the following manner. 23 g of the polymer were mixed with 0.1% by weight of an antioxidant ('Topanol' CA), and the mixture was added to a Brabender Plasticiser, at 190° C., 30 rpm and under a load of 10 kg to convert it to a crepe. The crepe was placed within a template, between aluminium foil and pressed by means of an electric Tangye press at a temperature of 250° C. The pressing was pre-heated for a period of 6 minutes, under just enough pressure to make the polymer flow across the template, that is an applied force of about 1 tonne. After the pre-heat period, the applied force was raised to 15 tonnes in 5 tonne increments, degassing (that is releasing pressure) every 5 tonnes. After 2 minutes at 15 tonnes, the press was cooled by means of air and water for 10 minutes or until room temperature was reached. The plaque produced was then cut into strips of dimensions 150 × 19 × 1.6 mm. Duplicate strips of each polymer were placed into an annealing oven at 130° C. and after 2 hours at this temperature the heat was switched off and the oven cooled to ambient temperature at 15° C. per hour.
(f) The titanium (Ti), aluminium (Al) and chlorine (Cl) residues from the catalyst are given in parts per million by weight relative to the total polymer product (polymer + catalyst residues) and were measured by X-ray fluorescence on compression moulded discs.
(h) PD is the packing density which is determined by introducing 10 grammes of the polymer powder into a 50 cm³ flat-bottomed graduated tube of 2 cm internal diameter. The polymer powder is compacted by striking the base of the tube against a horizontal surface a total of 30 times. The volume occupied by the polymer powder was then determined. Duplicate measurements are made.
ND means that this property was not determined for the polymer.

Some of the polymer products were subjected to particle size analysis by sieving and the results are set out in Table Two.

TABLE TWO

| Particle size (microns) | % Weight retained | | | | |
|---|---|---|---|---|---|
| | Ex 11 | Ex 16 | Ex 17 | Ex 18 | Ex 20 |
| >850 | 1.8 | 0.5 | 5.2 | 8.1 | 4.8 |
| 850–500 | 9.6 | 8.2 | 23.2 | 28.3 | 21.6 |
| 500–425 | 4.7 | 5.5 | 8.0 | 9.9 | 9.2 |
| 425–300 | 13.5 | 16.9 | 17.1 | 20.7 | 21.7 |
| 300–212 | 11.9 | 13.2 | 11.8 | 11.1 | 14.1 |
| 212–125 | 15.6 | 15.7 | 12.8 | 10.0 | 13.7 |
| 125–75 | 20.2 | 14.3 | 10.0 | 6.2 | 8.4 |
| <75 | 22.8 | 25.7 | 11.9 | 5.7 | 6.4 |

EXAMPLES 22 TO 24

Propylene was polymerised continuously in the gas phase as described hereafter. To initiate the polymerisation, the reaction vessel initially contained about 5 kg of polypropylene powder having a flexural modulus of 1.45 GN/m², and containing 4% by weight of polymer soluble in boiling heptane by Soxhlet extraction for 24 hours.

Polymerisation was effected in a 25 dm³ stainless steel autoclave fitted with a stirrer and having a heating jacket. Initially, the polypropylene powder was placed in the autoclave. The pressure was reduced to 75 millibars and then nitrogen was added to a pressure of one bar, this procedure being carried out a total of three times. The stirrer was rotated at 60 rpm and stirring was continued throughout the following procedure. The autoclave was heated up to 80° C., and the pressure was reduced to 75 millibars. Liquid propylene was added to the autoclave and vaporised to raise the pressure to 26 kg/cm² gauge. Hydrogen was added separately in the proportion of 15.% by weight relative to the propylene.

Solutions of a trialkyl aluminium compound and an ester in the aliphatic hydrocarbon were fed into the autoclave. A suspension containing a titanium composition was also introduced into the autoclave. The trialkyl aluminium compound, the ester and the titanium composition were added until polymerisation was observed to start. Liquid propylene was being introduced, and gaseous propylene vented off, whilst the catalyst was being added.

Once polymerisation had started, venting of the autoclave was stopped, liquid propylene at 20° C. was introduced into the autoclave at a rate (about 2 kg/hr) to maintain a pressure of 26 kg/cm² and polypropylene, saturated with propylene, was intermittently withdrawn from the autoclave at a desired rate, typically about 2 kg of polymer per hour. The temperature and pressure were maintained at 70° C. and 26 kg/cm² gauge repectively. The rate of adding the suspension of the titanium composition was adjusted to maintain the rate of polymer production at the desired rate. During the operation of the autoclave, the nature of the titanium composition, thaluminium trialkyl compound and the ester were changed and operation of the autoclave was continued using various different catalyst systems. After polymerisation had been progressing for 60 hours, the catalyst system was again changed to include the use of the product of Example 7. The titanium composition of Example 7 was added as a settled suspension containing about on gramme of solid per cm³ of the suspension and this settled suspension was added in portions of 0.08 cm³ at a rate of 150 such portions every hour.

The trialkyl aluminium compound was tri-isobutyl aluminium and the ester was methyl p-methylbenzoate. The aluminium compound and the ester had been mixed together in the aliphatic hydrocarbon at ambient temperature and then stored for at least 12 hours before being used, both the mixing and storing being effected under propylene at a propylene pressure of one atmosphere. The pre-mixed solution was 0.68 M with respect to the tri-isobutyl aluminium and was 0.27 M with respect to the methyl p-methylbenzoate and this solution was added to the autoclave at the rate of 28 cm$^3$ per hour.

Polymer samples were removed at various times during the polymerisation and the properties of the polymer products removed at various times are set out in Table Three.

TABLE THREE

| Example | Time (hours) (i) | MFI (j) | FM (e) | Ti (f) | Al (f) | Cl (f) | PD (g/l) (h) |
|---|---|---|---|---|---|---|---|
| 22 | 6 | 2.7 | 1.58 | 6 | 201 | 195 | ND |
| 23 | 8 | 4.9 | 1.62 | 7 | 172 | 188 | 408 |
| 24 | 10 | 1.2 | 1.44 | 7 | 193 | 226 | ND |

Notes to Table Three
(e), (f) and (h) are all as defined in Notes to Table One.
(i) The time is the time, in hours, from the commencement of using the specified catalyst system under the specified operating conditions.
(j) MFI is the melt flow index as defined in Note (d) to Table One but using a temperature of 230° C. and a 2.16 kg weight.

A sample of the product removed after eight hours polymerisation was subjected to particle size analysis by sieving and the results are set out in Table Four.

TABLE FOUR

| Particle size (microns) | % Weight Retained |
|---|---|
| >850 | 1.2 |
| 850–500 | 7.9 |
| 500–425 | 4.9 |
| 425–300 | 17.6 |
| 300–212 | 13.1 |
| 212–125 | 30.8 |
| 125–75 | 22.3 |
| <75 | 2.2 |

Examples 25 and 26 illustrate the incorporation of the process of the present invention into the preparation of a transition metal composition carried out in accordance with our copending British Patent application, No. 8124149 entitled "Transition Metal Composition, Production and Use". In Examples 25 and 26, pulverisation was effected by a simultaneous vigorous agitation and shearing action.

EXAMPLE 25

(A) Milling magnesium chloride and ethyl benzoate

A Siebtechnik SM10 Vibromill having a total volume of about 38 dm$^3$ and containing 119 kg of stainless steel balls of 25 mm diameter was sealed, and purged with nitrogen to give a nitrogen atmosphere in the mill. A mixture of water and ethylene glycol at 0° C. was passed through the jacket of the mill and the mill was vibrated at a frequency of 1500 oscillations per minute and an amplitude of 2 mm. Four kilogrammes of essentially anhydrous magnesium chloride (BDH technical grade) were introduced into the mill whilst the mill was being vibrated. After the addition of the magnesium chloride, the mill was vibrated for about 15 minutes and 2 dm$^3$ of ethyl benzoate were added to the vibrating mill over a period of about 15 minutes. The mill was then vibrated for a further 24 hours whilst continuing to pass the mixture of water and ethylene glycol at 0° C. through the jacket of the mill.

After 24 hours, the mill was inverted, the inverted mill was vibrated and the milled magnesium chloride-ethyl benzoate was collected under nitrogen. The molar ratio of magnesium chloride to ethyl benzoate in the mill was about 3 to 1.

(B) Dispersion of milled magnesium chloride-ethyl benzoate

A one dm$^3$ three-necked glass flask having a heating-/cooling jacket, was fitted with a high shear homogeniser of the Ultra Turrax T45 type (available from Janke and Kunkel KG IKA Werke). Into the flask were introduced 630 g of nitrogen sparged toluene, 245 g of the milled material obtained in stage (A) and 1.62 g of polystyrene ("Lustrex" HF 66—available from Monsanto Limited). Water at ambient temperature was passed through the heating/cooling jacket. The mixture was then subjected simultaneously to vigorous agitation and shearing by operating the homogeniser for five minutes at maximum power (an initial rate of stirring of 10,000 rpm). During the agitation and shearing, the temperature of the mixture rose but did not exceed 50° C.

The dispersion was then transferred to a storage vessel (a 2 dm$^3$ three-necked glass flask fitted with a stirrer) and, whilst stirring, a further 0.8 g of polystyrene was added. The mixture was stirred for a further 30 minutes.

(C) Spray-drying of magnesium chloride-ethyl benzoate dispersion

The dispersion obtained in stage (B) was spray-dried using a glass laboratory scale spray-drying apparatus as described in stage (H) of Example 1. The spray nozzle used was a ¼ JAU Automatic Air Atomizing Nozzle obtained from Spraying Systems Co. of the USA and having a 0.52 mm diameter nozzle.

Spraying was effected under nitrogen by passing a stream of nitrogen, preheated to a temperature of 130° C., through conduit 11 at a rate of 190 dm$^3$/minute. Nitrogen at a pressure of about 0.5 kg/cm$^2$ gauge was introduced into the spray nozzle through conduit 8. The suspension obtained in stage (B) was fed from the 2 dm$^3$ three-necked glass flask to the spray nozzle by the application of an excess nitrogen pressure of 0.07 kg/cm$^2$ to this flask.

(D) Contacting with titanium tetrachloride 100 grammes of the spray-dried product from stage (C) were transferred to a two dm$^3$ jacketted glass vessel which was provided with a stirrer. One dm$^3$ of titanium tetrachloride were added to the vessel, the stirrer was started and heating was applied to the jacket. Heating was continued until a temperature of 100° C. was attained, which took 0.5 hours. The temperature was maintained at 100° C., and stirring was continued, for three hours. At the end of three hours, the stirrer was stopped and the solid was allowed to settle whilst continuing to heat the contents of the vessel. Two hours after terminating the stirring, the supernatant liquid was siphoned off from the settled solid. The heating was switched off and the contents of the vessel allowed to cool by standing overnight.

The contacting with the titanium tetrachloride was repeated by adding one dm$^3$ of titanium tetrachloride to the cold residue remaining from the previous contacting, the conditions of treatment being as previously described.

(E) Washing

To the residue remaining from stage (D) was added 1.5 dm³ of the n-heptane fraction at ambient temperature. The mixture was stirred and heated up to reflux temperature (about 100° C.). Stirring at reflux temperature was continued for an hour and then ceased. After a further 30 minutes, the supernatant liquid was siphoned off from the settled solid whilst still heating.

After ten minutes, a further 1.5 dm³ of the n-heptane fraction at ambient temperature was added to the hot residue and the mixture was heated up to 100° C. and was stirred at that temperature for one hour. The stirrer was switched off and the solid allowed to settle. After one hour, the supernatant liquid was siphoned off from the settled solid. The heater was switched off and the settled solid allowed to cool overnight.

To the residue remaining from the previous washing step was added one dm³ of the n-heptane fraction at ambient temperature. The mixture was stirred for 15 minutes without heating and allowed to settle. After 35 minutes the supernatant liquid was siphoned off from the settled solid. This procedure was repeated once.

The cold residue remaining from the fourth washing step was diluted with the n-heptane fraction to give a final volume of one dm³ and the mixture was transferred to a storage vessel under nitrogen.

A sample (5 cm³) of the mixture was treated with 2N sulphuric acid and the aqueous layer was subjected to spectrophotometric analysis. The mixture was found to contain 2.7 milligramme atoms of titanium/dm³, 72 milligramme atoms of magnesium and 160 milligramme atoms of chloride/dm³. The solid component had a titanium content of 1.64% by weight.

EXAMPLE 26

The procedure was similar to that described in Example 25, the main difference being that the order in which the various stages were effected was changed so that the material which was dispersed and spray-dried had been previously treated with titanium tetrachloride and washed.

(A) Milling magnesium chloride and ethyl benzoate

The milled magnesium chloride-ethyl benzoate used had been obtained by the procedure of stage (A) of Example 25.

(B) Contacting with titanium tetrachloride

The procedure described in stage (D) of Example 25 was repeated using a 5 dm³ jacketted glass vessel, 205 g of the product of stage (A) of Example 25 and 2 dm³ of titanium tetrachloride for each treatment with titanium tetrachloride.

(C) Washing

To the residue remaining from stage (B) was added 3 dm³ of the n-heptane fraction at ambient temperature. The mixture was stirred and heated up to reflux temperature (about 100° C.). Stirring at reflux temperature was continued for an hour and then ceased. After a further 3 hours 20 minutes, the supernatant liquid was siphoned off from the settled solid whilst still heating. Heating was then ceased and the residual material was allowed to cool by standing overnight.

A further washing step was effected by adding 3 dm³ of the n-heptane fraction at ambient temperature to the cold residue. The mixture was stirred and heated up to 70° C. over a period of 40 minutes. The stirrer was switched off and the solid allowed to settle while maintaining the temperature at about 60° C. After two hours 20 minutes, the supernatant liquid was siphoned off from the settled solid, heating was ceased and the residual material was allowed to cool by standing for about 68 hours.

To the cold residue remaining from the previous washing step was added a 2.5 dm³ of the n-heptane fraction at ambient temperature. The mixture was stirred for 15 minutes without heating and allowed to settle. After two hours, the supernatant liquid was siphoned off from the settled solid. This procedure was repeated twice.

The cold residue remaining from the fifth washing step was diluted with the n-heptane fraction to give a final volume of one dm³ and the mixture was transferred to a storage vessel under nitrogen.

(D) Dispersing magnesium chloride-titanium tetrachloride product

A sample containing about 200 grammes of the product of stage (C) was allowed to settle and the supernatant n-heptane heptane fraction siphoned off. 1.5 dm³ of toluene was added, the mixture was stirred for 5 minutes at ambient temperature, allowed to settle and the supernatant liquid was siphoned off. This procedure was repeated twice.

The residual mixture (about 600 cm³) from the third washing was introduced into the flask fitted with the Ultra Turrax homogeniser as described in stage (B) of Example 25. A further 100 cm³ of toluene was used to rinse out residues from the storage vessel to the flask. 2.5 g of polystyrene ("Lustrex" HF 66) were added to the flask.

Water at ambient temperature was passed through the heating/cooling jacket. The homogeniser was operated for about 2.5 minutes at maximum power. After 1.5, and again after 2.0 minutes, extra toluene (100 cm³) was added. When the agitation had been completed, a further 100 cm³ of toluene was added to assist in transfer of the dispersion to a 2 dm³ three-necked glass flask fitted with a stirrer and, whilst stirring, a further 2.0 g of polystyrene was added.

(E) Spray-drying of magnesium chloride-titanium tetrachloride dispersion

The dispersion obtained in stage (D) was spray-dried using essentially the same procedure as used in stage (C) of Example 25 with the following exceptions.

The diameter of the spray nozzle was 0.72 mm. The pre-heated nitrogen was at a temperature in the range 140° to 145° C. The nitrogen passed through the conduit 8 was at a pressure of about 0.56 kg/cm² gauge. Initially, the excess nitrogen pressure applied to the mixture in the 2 dm³ three necked glass flask was 0.1 kg/cm². The product collected will be referred to hereafter by the reference 26L.

Since the initial rate of spraying was low, the pressure in the flask containing the dispersion was increased to 0.25 kg/cm². The product obtained using this higher applied pressure will be referred to hereafter by the reference 26H.

Examples 27 to 30 illustrate pulverisation by a simultaneous vigorous agitation and shearing process, and subsequent spray-drying, of titanium trichloride materials.

EXAMPLE 27

(A) Dispersing of titanium trichloride 280 g of a titanium trichloride material (Stauffer TiCl$_3$-AA) were suspended in 750 cm$^3$ of toluene. The suspension was then transferred to a 1.2 dm$^3$ three-necked glass flask having a heating/cooling jacket and fitted with an Ultra Turrax T45 type high shear homogeniser.

Water at ambient temperature was passed through the heating/cooling jacket. The monogeniser was then operated at maximum power for 2.5 minutes, switched off, 200 cm$^3$ of toluene added and the homogeniser operated at maximum power for a further two minutes. About half of the mixture was removed, 100 cm$^3$ of toluene was added to the remainder and the homogeniser operated at maximum power for a further one minute. The dispersion thus obtained was transferred to a storage flask and stirred until spray-dried as described in stage (B).

(B) Spray-drying dispersed titanium trichloride

To the dispersion obtained in stage (A) was added polystyrene ("Lustrex" HF 66) in an amount of 1% by weight relative to the weight of titanium trichloride. The dispersion was then spray-dried using the general procedure of stage (C) of Example 25 with the following exceptions.

The diameter of the spray nozzle was 0.72 mm. The preheated nitrogen was at a temperature of about 140° C. The nitrogen passed through the conduit 8 was at a pressure of about 0.25 kg/cm$^2$ gauge. The excess nitrogen pressure applied to the dispersion in the storage flask was 0.1 kg/cm$^2$.

When about half of the dispersion had been spray-dried, spraying was stopped and a further quantity of polystyrene was added to give 2% by weight of polystyrene relative to the weight of titanium trichloride. Spraying was resumed and the product was collected. The product obtained in the presence of 2% by weight of polystyrene will be referred to hereafter by the reference 27.

EXAMPLE 28

(A) Dispersing of titanium trichloride-butyl benzoate

The procedure of stage (A) of Example 27 was repeated with the following variations.

The mixture which was homogenised consisted of 119 g of titanium trichloride, 26 cm$^3$ of butyl benzoate, 390 cm$^3$ of toluene and 3 g of polystyrene ("Lustrex" HF 66). After operating the homogeniser at maximum power for 2.75 minutes, the contents of the flask had formed an immobile gel-like product and the temperature had risen to above 50° C. Homogenisation was terminated and 500 cm$^3$ of toluene were added to assist in the transfer of the dispersed solid to a storage vessel.

(B) Spray-drying dispersed titanium trichloride

The dispersion of stage (A) was spray-dried using the general procedure of stage (C) of Example 25 with the following exceptions.

The diameter of the spray nozzle was 0.72 mm. The preheated nitrogen was at a temperature of about 140° C.

EXAMPLE 29

(A) Milling titanium trichloride and tri-n-butyl phosphine

The procedure of Example 2 of British Patent Specification 1 485 181 was repeated using titanium trichloride (Stauffer TiCl$_3$-AA) and tri-n-butyl phosphine in a molar ratio of 4.2:1. During the milling, the temperature rose to a maximum of 85° C.

521 g of the milled product were suspended in 1086 g of toluene. 5.2 g of polystyrene ("Lustrex" HF 66) were added to the suspension.

(B) Dispersing of titanium trichloride-tri-n-butyl phosphine

About 700 cm$^3$ of the suspension produced in stage (A) were transferred to the one dm$^3$ flask described in stage (B) of Example 25. The homogeniser was operated for 5 minutes to give a thick dispersion. The temperature rose to 69° C. during this treatment. The thick dispersion was transferred to the 2 dm$^3$ storage vessel and the one dm$^3$ flask was washed out with 200 cm$^3$ of toluene and the washings added to the contents of the storage vessel which were being stirred.

(C) Spray-drying dispersed titanium trichloride

The dispersion of stage (B) was spray-dried using the general procedure of stage (C) of Example 25 with the following exceptions.

The pre-heated nitrogen was at a temperature in the range 130° to 135° C. The excess nitrogen pressure applied to the dispersion in the storage flask was 0.13 kg/cm$^2$. The spray-drying was terminated after about 30 minutes, when the end of conduit 8 became blocked at the orifice 10.

EXAMPLE 30

(A) Milling titanium trichloride and tri-n-butyl phosphine

The milling procedure of stage (A) of Example 29 was repeated.

(B) Washing titanium trichloride-tri-n-butyl phosphine 457 g of the milled product of stage (A) were suspended in 1.5 dm$^3$ of toluene in a 2 dm$^3$ three necked flask and the mixture was allowed to settle overnight.

The supernatant liquid was siphoned off and one dm$^3$ of toluene was added. The flask was transferred to a water bath. The contents of the flask were stirred and the temperature of the water bath raised to 100° C. over a period of 25 minutes. Heating of the water bath was terminated. Stirring of the flask contents was continued for 20 minutes, by which time the temperature of the water bath had fallen to 82° C. Stirring was then stopped and the solid was allowed to settle over a period of 90 minutes. The supernatant liquid was then siphoned off. The flask was removed from the water bath.

A further one dm$^3$ of toluene was added and the mixture was stirred at ambient temperature for one hour. Stirring was stopped and the solid allowed to settle over the weekend (about 65 hours).

The supernatant liquid was siphoned off, fresh toluene was added to give a solid content of 30% by weight of the total weight of the suspension. 4.57 g of polystyrene ("Lustrex" HF 66) were added.

(C) Dispersing of washed titanium trichloride

The dispersion obtained in stage (B) was divided into two approximately equal portions. Each portion was homogenised for 1.5 minutes using the apparatus and procedure of stage (B) of Example 25. The two samples of dispersed titanium trichloride were placed in the storage vessel and stirred together until spray-dried.

(D) Spray-drying dispersed titanium trichloride

The combined dispersions of stage (C) were spray-dried using the general procedure of stage (C) of Example 25 with the following exceptions.

The diameter of the spray nozzle was 0.72 mm. The pre-heated nitrogen was at a temperature in the range 140° C. to 145° C. The nitrogen passed through the conduit 8 was at a pressure of about 0.42 kg/cm$^2$ gauge. Unlike spray-drying stage B of Example 29, no blockage of the nozzle occurred.

EXAMPLES 31 TO 33

Polymerisation was carried out in an 8 dm$^3$ stainless steel autoclave in a manner similar to that used for Examples 11 to 21 with the following exceptions. 40 cm$^3$ of a solution in the aliphatic hydrocarbon containing 20 millimole of aluminium tri-isobutyl were added to the autoclave followed by 40 cm$^3$ of a solution in the aliphatic hydrocarbon containing 7 millimoles of methyl p-methylbenzoate. A spray-dried magnesium chloride supported titanium halide composition obtained in Example 25 or Example 26 was then added as a suspension of the spray-dried solid in n-heptane.

The autoclave was maintained at 70° C. while propylene was passed into the autoclave to achieve a pressure of 10 kg/cm$^2$ absolute. 10 millimoles of hydrogen were then added. The pressure was maintained at 10 kg/cm$^2$ absolute by feeding propylene. After 0.5 hour, and again after one hour, further 10 millimole quantities of hydrogen were added to the autoclave. After 2 hours, the propylene feed was terminated and the autoclave was vented to atmospheric pressure. The polymer suspension was passed into a receptacle and the polymer was filtered off in air. A sample of the polymer was dried at 100° C. in a fluidised bed using nitrogen as the fluidising gas.

Further details of the polymerisation conditions, and the properties of the products obtained, are given in Table Five.

TABLE FIVE

| | Ti Compn | | Polymer Properties | | | | |
|---|---|---|---|---|---|---|---|
| Example | Type (K) | Amount (mM) | MFI (d) | FM (e) | Ti (f) | Al (f) | Cl (f) |
| 31 | 25 | 0.058 | 25.5 | 1.47 | 5 | 197 | 186 |
| 32 | 26L | 0.15 | 20.2 | 1.57 | 4 | 167 | 112 |
| 33 | 26H | 0.15 | 20.3 | 1.46 | 8 | 155 | 337 |

Notes to Table Five
(d), (e) and (f) are all as defined in Notes to Table One.
(k) Type refers to the Example in which the production of the titanium component is described, and includes the specific references noted in the Examples.

EXAMPLE 34

The procedure of Examples 31 to 33 was repeated with the changes noted hereafter.

Polymerisation was effected using a two component catalyst system consisting of 30 millimoles of diethyl aluminium chloride and sufficient of the product of Example 27 to provide 10 millimoles of titanium trichloride. The polymerisation pressure was 10.g kg/cm$^2$ gauge. 40 millimole quantities of hydrogen were added to the autoclave when the pressure was 1.1 kg/cm$^2$ absolute, again on attaining the polymerisation pressure of 10.4 kg/cm$^2$ gauge and again after polymerising for one hour. The polymer obtained had a flexural modulus of 1.60 GN/m$^2$ and a packing density (as defined in Note (h) to Table One of 476 g/dm$^3$.

The polymer product was subjected to particle size analysis by sieving and the results are set out in Table Six.

TABLE SIX

| Particle size (microns) | % Weight Retained |
|---|---|
| >850 | 4.7 |
| 850–500 | 13.3 |
| 500–425 | 6.5 |
| 425–300 | 17.2 |
| 300–212 | 15.7 |
| 212–125 | 22.7 |
| 125–75 | 14.2 |
| <75 | 5.8 |

EXAMPLES 35 TO 37

Into a stainless steel autoclave having a total capacity of 8 dm$^3$ which was fitted with a stirrer were placed 400 g of polypropylene powder having a flexural modulus of 1.45 GN/m$^2$ and 4.0% by weight of which remained dissolved after refluxing 1 g of polymer with 50 cm$^3$ of xylene and cooling the solution to ambient temperature. The autoclave was evacuated to a pressure of 75 millibar and then nitrogen was introduced to restore the pressure to one bar absolute, this procedure being carried out a total of three times. The stirrer was started at 60 rpm and the autoclave was heated up to 80° C. whilst passing nitrogen through the autoclave. The pressure was reduced to 75 millibars and liquid propylene was added to raise the pressure to atmospheric pressure (one bar absolute). 20 millimoles of diethyl aluminium chloride were added as a 1.3 M solution in the aliphatic hydrocarbon. The product of one of Examples 28, 29 or 30 was then added in an amount equivalent to two millimoles of titanium trichloride as a suspension in sufficient of the 1.3 M molar solution of diethyl aluminium chloride in the aliphatic hydrocarbon to provide a further 10 millimoles of diethyl aluminium chloride. The autoclave was pressurised to 28 kg/cm$^2$ absolute by the addition of liquid propylene. During the pressurisation, 17 millimole quantities of hydrogen were added when the pressure attained 7 kg/cm$^2$, 14 kg/cm$^2$, 21 kg/cm$^2$ and finally at 28 kg/cm$^2$. Polymerisation was carried out in the gas phase for three hours maintaining an autoclave pressure of 28 kg/cm$^2$ absolute by further addition of liquid propylene. During the polymerisation, 13 millimole quantities of hydrogen were added for every 200 cm$^3$ of liquid propylene added.

The results obtained are set out in Table Seven.

TABLE SEVEN

| | TiCl$_3$ | Polymer Properties | | | | |
|---|---|---|---|---|---|---|
| Example | type (k) | MFI (d) | FM (e) | Ti (f) | Al (f) | Cl (f) |
| 35 | 28 | 22.7 | 1.51 | 126 | 690 | 523 |
| 36 | 29 | 10.9 | 1.54 | 75 | 381 | 302 |
| 37 | 30 | 32.0 | 1.53 | 60 | 357 | 297 |

Notes to Table Seven
(d), (e) and (f) are all as defined in Notes to Table One.
(k) is defined in Notes to Table Five.

The polymer products of Examples 36 and 37 were subjected to particle size analysis by sieving and the results are set out in Table Eight.

TABLE EIGHT

| Particle size (microns) | % Weight Retained | |
|---|---|---|
| | Example 36 | Example 37 (1) |
| >850 | 28.6 | 16.6 |
| 850–500 | 23.7 | 20.5 |
| 500–425 | 7.2 | 9.1 |
| 425–300 | 24.3 | 30.0 |
| 300–212 | 9.5 | 13.4 |
| 212–125 | 4.7 | 8.0 |
| <125 | 2.3 | 2.5 |

Notes to Table Eight
(1) Average of two determinations.

The product of Example 36 had a packing density of 455 g/dm$^3$ and the product of Example 37 had a packing density of 488 g/dm$^3$.

EXAMPLES 38 TO 41

Into a 100 dm$^3$ stainless steel autoclave having a heating jacket and fitted with a stirrer were placed 36 kg of polyproplene powder having a flexural modulus 1.45 GN/m$^2$ and 4.0% by weight of which was soluble in hot heptane as determined from the weight loss after Soxhlet extraction using boiling heptane for 24 hours. The pressure was reduced to 75 millibars and then nitrogen was added to a pressure of one bar, this procedure being carried out a total of three times. The stirrer was rotated at 60 rpm and stirring was continued throughout the following procedures. The autoclave was heated up to 80° C., whilst passing nitrogen through the autoclave. The pressure was reduced to 75 millibars and liquid propylene was added to the autoclave and vaporised to raise the pressure to 28 kg/cm$^2$ gauge. Hydrogen was added separately in the proportion of 1.5% by weight relative to the propylene.

A solution of diethyl aluminium chloride in the aliphatic hydrocarbon and a 40% by weight suspension in the aliphatic hydrocarbon of a titanium trichloride material were introduced into the autoclave in the molar proportions of 8:1 until polymerisation was observed to start. Liquid propylene was being introduced, and gaseous propylene vented off, whilst the catalyst was being added.

Once polymerisation had started, venting of the autoclave was stopped, liquid propylene at 20° C. was introduced into the autoclave at a rate to maintain the pressure at 28 kg/cm$^2$ gauge (about 15 kg/hr) and polypropylene, saturated with propylene, was intermittently withdrawn from the autoclave at a rate of about 10 to 12 kg of polymer per hour. The temperature and pressure were maintained at 75° C. and 28 kg/cm$^2$ gauge respectively. The diethyl aluminium chloride solution and the suspension were continuously introduced into the autoclave in the molar proportions of diethyl aluminium chloride to titanium trichloride of 8 to 1 and at a rate to maintain the rate of polymer production at the desired rate of 10 to 12 kg/hr of polymer.

Initially, polymerisation was effected using a titanium trichloride product obtained as described in stage (A) of Example 29 and subjected to no further treatment (this product will be identified hereafter by the reference (A29). Subsequently the product of Example 30 was used.

Some properties of the polymer products removed at various times during the polymerisations are set out in Table Nine and Table Ten gives the results of particle size analysis, by sieving, of two samples.

TABLE NINE

| Ex or Comp Ex | TiCl3 type (k) (m) | Time (hrs) (i) | MFI (j) | FM (e) | Ti (f) | Al (f) |
|---|---|---|---|---|---|---|
| 38 | 30 | 17 | 2.3 | 1.56 | 63 | 191 |
| 39 | 30 | 19 | 2.5 | ND | ND | ND |
| 40 | 30 | 21 | 3.2 | 1.58 | 60 | 202 |
| 41 | 30 | 23 | 3.2 | 1.59 | 68 | 212 |
| A | A29 | 17 | 2.2 | 1.64 | 63 | 200 |
| B | A29 | 19 | 2.2 | 1.49 | 48 | 222 |

Notes to Table Nine
(e) and (f) are both as defined in Notes to Table One.
(i) and (j) are both as defined in Notes to Table Three.
(k) is as defined in Notes to Table Five.
(m) A29 is a material obtained by stage (A) only of Example 29.

TABLE TEN

| Particle Size (microns) | % Weight Retained | |
|---|---|---|
| | Example 39 | Comp Ex B |
| >850 | 4.3 | 54.4 |
| 850–500 | 17.3 | 14.3 |
| 500–425 | 8.4 | 3.2 |
| 425–300 | 25.4 | 7.2 |
| 300–212 | 19.6 | 5.1 |
| 212–125 | 17.5 | 6.7 |
| 125–75 | 6.2 | 5.9 |
| <75 | 1.4 | 3.4 |

The product of Example 39 had a packing density of 513 g/dm$^3$ whereas the product of Comparative Example B had a packing density of 364 g/dm$^3$. The product of Example 39 was in the form of essentially spherical particles and this material flowed more freely than the product of Comparative Example B.

In the following Examples, Examples 42, 43, 45 and 47 illustrate the incorporation of the process of the present invention, in which pulverising is effected by grinding in a ball-mill, into the procedure disclosed in more detail in our copending Patent Application Ser. No. 444,364 entitled "Composition, Production and Use".

EXAMPLE 42

(A) Milling magnesium chloride, thionyl chloride and ethyl benzoate

The procedure of stage (A) of Example 1 was repeated with the modifications as set out hereafter. 180.5 grammes of the magnesium chloride and 6.6 cm$^3$ of thionyl chloride were introduced into the mill chamber and milling with thionyl chloride was effected for two hours while passing water at ambient temperature through the jacket of the mill chamber. The mill chamber was then cooled by passing a mixture of water and ethylene glycol at −12° C. through the jacket of the mill chamber whilst continuing to vibrate the mill assembly. The mill was cooled to 0° C. over a period of 1.25 hours whilst continuing to mill, 45.5 cm$^3$ of ethyl benzoate were then added and milling at 0° C. was continued for a further 24 hours. The molar ratio of magnesium chloride to ethyl benzoate in the mill chamber was about 6 to 1.

(B) Milling with toluene 400 cm$^3$ of toluene were added to the mill chamber whilst continuing to vibrate the mill. Milling was continued in the presence of the added toluene at 0° C. for a further 30 minutes.

After 30 minutes, the mill was inverted, the inverted mill was vibrated and the mixture of the milled solid and toluene was collected under nitrogen. The mill chamber was washed out with a further 300 cm³ of toluene, which was added to the suspension previously removed.

After standing for 65 hours, the milled mixture was still fluid but was viscous. The mixture was stirred and 39 cm³ of a 10% weight/volume solution of polystyrene ('Styron' 686/7—available from Dow Chemical Company) in toluene was added to provide 2.0% by weight of polystyrene relative to the milled solid. This mixture had a solid content of 24% by weight.

(C) Spray drying milled solid/toluene mixture

All of dispersion obtained in stage (B) was spray-dried using the glass laboratory scale spray-drying apparatus as used in stage (C) of Example 1.

Spraying was effected under nitrogen by passing a stream of nitrogen, preheated to a temperature of 145° C., into the spray-drying apparatus at a rate of 190 dm³/minute. Nitrogen at a pressure of about 0.4 kg/cm² gauge was introduced into the spray nozzle. The suspension obtained in stage (B) was fed from the 2 dm³ three-necked glass flask to the spray nozzle by the application of an excess nitrogen pressure of 0.04 kg/cm² to this flask.

(D) Contacting with titanium tetrachloride

A sample (39 grammes) of the spray dried product from stage (C) was transferred to a 800 cm³ jacketted glass vessel which was provided with a stirrer. 390 cm³ of titanium tetrachloride were added to the vessel, the stirrer was started and heating was applied to the jacket. Heating was continued until a temperature of 100° C. was attained. The temperature was maintained at 100° C., and stirring was continued, for three hours. At the end of three hours, the stirrer was stopped and the solid was allowed to settle whilst continuing to heat the contents of the vessel. 50 minutes after terminating the stirring, the supernatant liquid was siphoned off from the settled solid. The heating was switched off and the contents of the vessel allowed to cool by standing overnight.

(E) Washing

To the residue remaining from stage (D) were added 450 cm³ of the aliphatic hydrocarbon at ambient temperature. The mixture was stirred and heated up to a temperature of 100° C. was continued for an hour and then ceased. After a further 75 minutes, the supernatant liquid was siphoned off from the settled solid whilst still heating. The heating was switched off and 450 cm³ of the aliphatic hydrocarbon at ambient temperature were added to the hot residue. The mixture was stirred without heating for 15 minutes, then the stirrer was switched off and the solid allowed to settle. After one hour, the supernatant liquid was siphoned off from the settled solid. This washing procedure was repeated twice more.

The cold residue remaining from the fourth washing step was diluted with the aliphatic hydrocarbon to give a final volume of 390 cm³ and the mixture was transferred to a storage vessel under nitrogen.

EXAMPLE 43

(A) Milling magnesium chloride and ethyl benzoate

A Siebtechnik SM50 Vibromill having a total volume of about 165 liters and containing 570 kg of steel balls of 25 mm diameter was purged thoroughly with nitrogen to give a nitrogen atmosphere in the mill. 16 kilogrammes of anhydrous magnesium chloride (as used in Example 1) were introduced into the mill which was cooled to −10° C. by passing a mixture of water and ethylene glycol at about −20° C. through the jacket of the mill.

Once the desired temperature had been achieved, the mill was vibrated using a frequency of 1500 oscillations per minute and an amplitude of 2 mm, whilst continuing to pass the mixture of water and ethylene glycol at −20° C. through the jacket of the mill.

4 dm³ of ethyl benzoate was added to the vibrating mill over a period of 2.25 hours, during which time the temperature rose to about 20° C. Milling was continued, whilst still cooling the mill, for a total milling time of 24 hours. The molar ratio of magnesium chloride to ethyl benzoate in the mill was about 6 to 1.

(B) Milling with toluene

Without removing the milled magnesium chloride-ethyl benzoate product of stage (A), 25 dm³ of toluene and 4 dm³ of a 10% weight/volume solution of polystyrene in toluene (as used in stage (B) of Example 42) were added to the vibrating mill. Milling was continued, whilst cooling, for a further 30 minutes and the magnesium chloride suspension produced was transferred, under nitrogen, into a drum of capacity 100 dm³.

25 dm³ of toluene were added to the mill, milling was effected for 20 minutes and the liquid, together with any residual magnesium chloride, was transferred to the drum.

(C) Spray drying milled solid/toluene mixture

The contents of the drum obtained as described in stage (B), were sprayed dried using spray-drying apparatus essentially as described with reference to FIG. 2. The spray-drying vessel had a dimeter of 2.2 m, a cylindrical height of 1.95 m and a 60° cone.

The circulating gas was nitrogen which was preheated to about 140° C. before entering the spray-drying vessel. The rate of supply of nitrogen was about 650 kg per hour.

The suspension was not pre-heated and hence was at ambient temperature on being fed to the spray-drying vessel.

The rate of rotation of the atomizer disc was 18000 rpm and the time during which the suspension was fed to the spray-drying vessel was 20 minutes.

(D) Contacting with thionyl chloride

A sample (16 grammes) of the spray dried product from stage (C) was transferred to a 800 cm³ jacketted glass vessel which was provided with a stirrer. 160 cm³ of the aliphatic hydrocarbon and 0.4 cm³ of thionyl chloride were added to the vessel, the stirrer was started and heating was applied to the jacket. Heating was continued until a temperature of 50° C. was attained. The temperature was maintained at 50° C., and stirring was continued, for one hour. At the end of one hour, the stirrer was stopped and the solid was allowed to settle whist continuing to heat the contents of the vessel. Ten minutes after terminating the stirring, the supernatant liquid was siphoned off from the settled solid.

(E) Contacting with titanium tetrachloride

To the hot residue from stage (D) were added 160 cm³ of titanium tetrachloride. The stirrer was started and heating was applied to the jacket. Heating was continued until a temperature of 100° C. was attained. The temperature was maintained at 100° C., and stirring was continued, for three hours. At the end of three hours, the stirrer was stopped and the solid was allowed to settle whilst continuing to heat the contents of the vessel. 40 minutes after terminating the stirring, the supernatant liquid was siphoned off from the settled solid. The heating was switched off and the contents of the vessel allowed to cool by standing overnight.

The treatment with titanium tetrachloride was repeated with the exception that the solid was allowed to settle for 45 minutes before the supernatant liquid was siphoned off and the residue was not allowed to cool.

(F) Washing

To the hot residue remaining from stage (E) were added 200 cm³ of the aliphatic hydrocarbon at ambient temperature. The mixture was stirred and heating was continued to raise the temperature to 100° C. Stirring at 100° C. was continued for an hours and then ceased. After a further 25 minutes, the supernatant liquid was siphoned off from the settled solid whilst still heating. The heating was switched off and 200 cm³ of the aliphatic hydrocarbon at ambient temperature were added to the hot residue. The mixture was stirred without heating for 10 minutes, then the stirrer was switched off and the solid allowed to settle. After one hour, the supernatant liquid was siphoned off from the settled solid. This washing procedure was repeated twice more.

The cold residue remaining from the fourth washing step was diluted with the aliphatic hydrocarbon to give a final volume of 160 cm³ and the mixture was transferred to a storage vessel under nitrogen.

EXAMPLE 44

The spray dried product of stage (C) of Example 43 was used and was subsequently treated in a similar manner to that described for stages (D) and (E) of Example 42. This material was not contacted with thionyl chloride.

(D) Contacting with titanium tetrachloride

The procedure of stage (D) of Example 42 was repeated using 27 grammes of the spray dried product of stage (C) of Example 43 and 270 cm³ *of titanium tetrachloride. The solid was allowed to settle for* 15 minutes and the supernatant liquid was siphoned off but the residue was not allowed to cool.

(E) Washing

The procedure was essentially as described in stage (E) of Example 42 with the exception that the hot residue from stage (D) was used and 300 cm³ of the aliphatic hydrocarbon were used for each wash. After the second wash, the solid was allowed to cool and settle for about 65 hours.

After the fourth wash, the residue was diluted to a volume of 270 cm³.

EXAMPLE 45

A sample of the spray dried product of stage C) of Example 43 was treated as generally described in stages (D), (E) and (F) of Example 43, but on a larger scale.

(D) Contacting with thionyl chloride

This was effected in a vessel of 6 dm³ capacity. 500 grammes of the spray dried product of stage (C) of Example 43, 5 dm³ of the aliphatic hydrocarbon and 13 cm³ thionyl chloride were used. The supernatant liquid was siphoned off 80 minutes after terminating the stirring.

(E) Contacting with titanium tetrachloride

This was effected in the same vessel as stage (D), using 3 dm³ of titanium tetrachloride for each contacting and maintaining the temperature at 100° C. for two hours. After the first contacting the solid was allowed to settle for one hour and after the second contacting the settling time was 1.5 hours.

(F) Washing

To the hot residue from stage (E) were added 5.5 dm³ of the aliphatic hydrocarbon and the mixture was allowed to stand, without heating, for 18 hours. The mixture was then stirred and heated to 100° C., maintained at 100° C. for one hour, allowed to settle for 10 minutes and the supernatant liquid was siphoned off. Heating was stopped and the three subsequent washes were effected using 5.5 dm³ of the aliphatic hydrocarbon for each wash. The residue was finally diluted to a total volume of 4.5 dm³.

EXAMPLE 46

The procedure was similar to that of Example 45 with the exception that stages (D), (E) and (F) were effected using smaller quantities of reagents and omitting thionyl chloride in stage (D).

(D) Contacting with the aliphatic hydrocarbon 200 grammes of the spray dried product of stage (C) of Example 43 and 2 dm³ of the aliphatic hydrocarbon were used. The supernatant liquid was siphoned off 35 minutes after terminating the stirring.

(E) Contacting with titanium tetrachloride 1.5 dm³ of titanium tetrachloride were used for the first contacting, and the solid was allowed to settle for 1.75 hours. Two dm³ of titanium tetrachloride were added to the residue and the mixture was allowed to stand, without heating, for 18 hours. The mixture was stirred, heated to 100° C., maintained at 100° C. for three hours and allowed to settle for one hour 20 minutes.

(F) Washing

Two dm³ of the aliphatic hydrocarbon were used for each wash. The aliphatic hydrocarbon was added to the hot residue from stage (E) and the temperature was raised to 100° C. After an hour at 100° C., the solid was allowed to settle for 40 minutes. The subsequent three washes were effected without heating and the residue was diluted to a total volume of 2 dm³.

EXAMPLE 47

The procedure was similar to that of Example 45 with the exception that stages (D), (E) and (F) were effected using smaller quantities of reagents and only one contacting step in stage (E).

(D) Contacting with thionyl chloride 200 grammes of the spray dried product of Example 43, 2 dm³ of the aliphatic hydrocarbon and 5.2 cm³ of thionyl chloride were used.

(E) Contacting with titanium tetrachloride

Two dm³ of titanium tetrachloride were used for a single contacting at 100° C. for three hours.

(F) Washing

Washing was effected directly after the titanium tetrachloride contacting, using 2 dm³ of the aliphatic hydrocarbon for each wash.

EXAMPLE 48

The procedure was as described for Example 47 with the exception that stage (D) was omitted.

EXAMPLE 49 TO 56

Polymerisation was carried out in an 8 dm³ stainless steel autoclave essentially as described for Examples 11 to 21 with the following exceptions. 40 cm³ of a solution in the aliphatic hydrocarbon containing 20 millimole of aluminium tri-isobutyl were added to the autoclave followed by 40 cm³ of a solution in the aliphatic hydrocarbon containing 7 millimoles of methyl p-methylbenzoate. 4 cm³ of a suspension of a titanium halide composition, obtained in one of Examples 42 to 48 were then added as a suspension.

The autoclave was maintained at 70° C. while propylene was passed into the autoclave to achieve a pressure of 11.5 kg/cm² absolute. 10 millimoles of hydrogen were then added. The pressure was maintained at 11.5 kg/cm² absolute by feeding propylene. 10 millimole quantities of hydrogen were added to the autoclave 0.5 and 1.0 hours after pressurising to 11.5 kg/cm² absolute. After 2 hours, the propylene was terminated and the autoclave was vented to atmospheric pressure. The polymer suspension was passed into a receptable and the polymer was filtered off in air. A sample of the polymer was dried at 100° C. in a fluidised bed using nitrogen as the fluidising gas. Some Properties of the polymers obtained are given in Table Eleven.

TABLE ELEVEN

| Example | Ti Compn Type (k) | Polymer Properties | | | | | |
|---|---|---|---|---|---|---|---|
| | | MFI (d) | FM (e) | Ti (f) | Al (f) | Cl (f) | PD (g/l) (h) |
| 49 | 42 | 21.0 | 1.50 | 7 | 152 | 196 | 421 |
| 50 | 43 | 37.3 | 1.53 | 6 | 152 | 210 | 408 |
| 51 | 44 | ND | 1.40 | 7 | 155 | ND | 408 |
| 52 | 45 | 31.5 | 1.42 | 8 | 134 | 177 | 408 |
| 53 | 45 | ND | 1.48 | 6 | 99 | 195 | 413 |
| 54 | 47 | 25.9 | 1.52 | 6 | 171 | 205 | 417 |
| 55 | 46 | 47.7 | 1.52 | 9 | 171 | 193 | 417 |
| 56 | 48 | 42.9 | 1.50 | 7 | 159 | 213 | 404 |

Notes to Table Eleven
(d), (e), (f) and (h) are all as defined in Notes to Table One.
(k) is as defined in Notes to Table Five.

For each polymer, a sample of the filtered polymer was washed with 60–80 petroleum ether and dried in a vacuum oven for 4 hours at a pressure of 50 mm of mercury and a temperature of 60° C. The dried polymer was subjected to particle size analysis by sieving and the results are set out in Table Twelve.

TABLE TWELVE

| Particle size (microns) | % Weight Retained | | | | | | | |
|---|---|---|---|---|---|---|---|---|
| | Ex 49 | Ex 50 | Ex 51 | Ex 52 | Ex 53 | Ex 54 | Ex 55 | Ex 56 |
| >850 | 2.9 | 1.6 | 0.5 | 2.5 | 1.2 | 1.2 | 0.9 | 0.8 |
| 850–500 | 17.9 | 28.2 | 18.6 | 39.5 | 33.9 | 30.9 | 21.6 | 22.5 |
| 500–425 | 7.1 | 13.1 | 12.3 | 16.3 | 16.5 | 16.2 | 12.6 | 12.7 |
| 425–300 | 15.7 | 24.4 | 24.8 | 28.5 | 29.1 | 27.6 | 23.1 | 25.1 |
| 300–212 | 9.9 | 13.0 | 14.0 | 9.4 | 13.2 | 13.4 | 12.7 | 13.5 |
| 212–125 | 11.4 | 11.1 | 13.5 | 2.9 | 4.9 | 8.2 | 12.1 | 12.5 |
| 125–75 | 11.9 | 5.4 | 9.9 | 0.8 | 1.0 | 2.1 | 8.0 | 7.5 |
| <75 | 23.2 | 3.3 | 7.5 | 0.1 | 0.3 | 0.4 | 9.0 | 5.5 |

EXAMPLE 57

(A) Milling magnesium chloride, thionyl chloride and ethyl benzoates

Milling was carried out in a vibration mill as described in stage (A) of Example 43. The magnesium chloride was anhydrous magnesium chloride obtained from Steetley Chemicals Trading Division, of Basing View, Basingstoke, Hampshire, England, and subsequently ground through a sieve plate of 6 mm mesh. The mill was purged with nitrogen as in Example 43 and vibration without being cooled. 16 kg of the magnesium chloride were introduced into the vibrating mill followed by 500 cm³ of thionyl chloride. Milling was effected for 2.5 hours whilst controlling the temperature at a maximum of 50° C. by the intermittent supply of a water-ethylene glycol coolant mixture at −20° C. through the jacket of the mill. Vibration and cooling were then terminated and the mill was allowed to stand for 16 hours.

The mill was cooled to about 5° C. by the passage of the coolant through the jacket of the mill and 8 dm³ of ethyl benzoate were added slowly over a period of about one hour. The mill was then vibrated for 24 hours whilst cooling and the milled product was then removed from the mill and stored under nitrogen.

(B) Contacting with titanium tetrachloride 15 kg of the milled product from stage (A) was transferred to a jacketted 200 dm³ steel reactor which was provided with a stirrer. 100 dm³ of titanium tetrachloride were added to the reactor, the stirrer was started and heating was applied to the jacket. Heating was continued until a temperature of 100° C. was attained. The temperature was maintained at 100° C., and stirring was continued, for three hours. At the end of three hours, the stirrer was stopped, and the solid was allowed to settle whilst continuing to heat the contents of the vessel. Two hours after terminating the stirring, the supernatant liquid was siphoned off from the settled solid. The settled solid was allowed to stand over a period of 4.5 hours whilst maintaining the temperature at 100° C.

(C) Washing

To the hot residue remaining from stage (B) were added 120 dm³ of the aliphatic hydrocarbon at ambient temperature over a period of 0.5 hours, whilst stirring the mixture. On adding the aliphatic hydrocarbon the temperature fell but, after 40 minutes, the temperature had risen to 100° C. Stirring at 100° C. was continued for one hour and the stirrer was then stopped whilst continuing to heat. After a further two hours the supernatant liquid was siphoned off from the settled solid.

After 40 minutes, 120 dm³ of the aliphatic hydrocarbon at ambient temperature were added to the hot residue from the first washing. The mixture was stirred for 45 minutes whilst heating to a temperature of 100° C. On attaining 100° C., stirring was continued for one hour, the stirrer was switched off and the solid allowed to settle whilst still heating. After two hours, the supernatant liquid was siphoned off from the settled solid and the heating was switched off.

To the hot residue were added 120 dm³ of the aliphatic hydrocarbon at ambient temperature. The mixture was stirred for 10 minutes without heating, stirring was stopped, the solid was allowed to settle for two hours and the supernatant liquid was siphoned off from the settled solid. This washing procedure was then repeated once more.

The residue was finally washed once using 80 dm³ of toluene, the procedure otherwise being similar to that used for the previous two washing steps.

(D) Dispersion of titanium-containing composition

The procedure of stages (A), (B) and (C) was repeated and the products of both of these repeated procedures were mixed in a 200 dm³ steel vessel fitted with a stirrer.

To the mixed products, which were being stirred, were added 5 dm³ of a 10% weight/volume solution of polystyrene ("Lustrex" HF66) in toluene. The mixture was stirred for a further 0.5 hour.

The mixture was then dispersed by being repeatedly circulated through a circulating loop connected to the 200 dm³ steel vessel, the circulating loop including a 275L Silverson high shear mixer available from Silverson Machines Limited, of Chesham, Buckinghamshire, England. After circulating the mixture for a period of two hours, the dispersion produced was transferred into a nitrogen purged, stainless steel drum having a capacity of 100 dm³. The mixture, which was stored under nitrogen, had a solids content of 32% weight/weight relative to the mixture and the polystyrene content was 2% weight/weight relative to the titanium-containing solid.

(E) Spray-drying titanium-containing dispersion

Spray-drying of the product of stage (D) was effected using the apparatus as used in stage (C) of Example 43. Nitrogen, which had been pre-heated to 140° C., was supplied at a flow rate of 700 kg per hour. The rate of rotation of the atomizer disc was 18000 rpm. The dispersion was passed to the apparatus at a rate of 135 kg/hour. The spray-dried solid was free-flowing and had a mean particle size of $40 \times 10^{-6}$ m.

The spray-dried solid was suspended in the aliphatic hydrocarbon.

EXAMPLES 58 TO 61

The product of Example 57 was used to effect continuous propylene polymerisation in the gas phase using a procedure generally as described for Examples 22 to 24.

Polymerisation was effected in a 0.8 m³ stainless steel autoclave fitted with a stirrer and having a heating jacket. The autoclave was charged with 90 kilogrammes of dry, dechlorinated, polypropylene powder obtained from a previous run using a similar type of catalyst. Heating was applied to the heating jacket and the contents of the reactor were stirred. When a temperature of about 70° C. had been attained, nitrogen was introduced into the autoclave to give a pressure of 5 bar absolute and the excess pressure was released to give a pressure of one bar absolute. The procedure was effected a total of five times. The procedure was then repeated, five times, using liquid propylene in place of nitrogen.

Liquid propylene was then added to raise the pressure to the desired operating pressure of 28 bar gauge. Hydrogen was added separately in the proportion of 1.5% by volume relative to the propylene.

A 1.5 M solution of tri-isobutyl aluminium in the aliphatic hydrocarbon and a 0.6 M solution of methyl-p-methylbenzoate in the aliphatic hydrocarbon were added separately and amounts to give the desired relative molar proportions of the two materials, the ester solution being added at a rate of 155 cm³/hour. A suspension containing the product of Example 57, and having a solids content of about 50% by weight, was also introduced into the autoclave.

Once polymerisation had commenced, the temperature and pressure were maintained at 73° C. and 28 bar gauge. Once polymerisation had commenced, the propylene removed from the autoclave was passed through a recycle loop containing a cooling system and returned to the autoclave. A further quantity of fresh liquid propylene was added to the autoclave to make up for propylene removed as polymer, or with the polymer. The temperature and pressure within the autoclave were controlled by the rate of addition of the liquid propylene (recycled and fresh) The product of Example 57 was added at a rate sufficient to maintain the polymer production at a desired rate of 45 kg/hour.

Further details of the polymerisation conditions, and some properties of the products obtained, are set out in Table Thirteen.

TABLE THIRTEEN

| Example | Ratio TBA/MT (n) | Time (hours) (i) | MFI (j) | FM (e) | Ti (f) | HHS (o) |
|---|---|---|---|---|---|---|
| 58 | 2.7 | 12 | 2.2 | 1.51 | 8 | 4.5 |
| 59 | 2.7 | 28 | 3.0 | 1.42 | 8 | 4.3 |
| 60 | 2.5 | 12 | 1.6 | 1.46 | 8 | 3.8 |
| 61 | 2.5 | 28 | 1.7 | 1.51 | 8 | 3.4 |

Notes to Table Thirteen
(e) and (f) are both as defined in Notes to Table One.
(i) and (j) are both as defined in Notes to Table Three.
(n) TBA/MT is the molar ratio of tri-isobutyl aluminium (TBA) to methyl-p-methylbenzoate (MT).
(o) HHS is the percentage of hot heptane soluble polymer as determined from the weight loss from a sample (about 20 g) of the polymer which has been subjected to extraction with boiling heptane using a Soxhlet extractor.

A polymer product removed from the autoclave after 20 hours, but otherwise using the polymerisation conditions as used for Examples 58 and 59, was subjected to particle size analysis by sieving and the results are set out in Table Fourteen.

TABLE FOURTEEN

| Particle Size (microns) | % Weight Retained |
|---|---|
| >850 | 11.4 |
| 850–500 | 29.8 |
| 500–425 | 9.7 |
| 420–300 | 18.9 |
| 300–212 | 11.7 |
| 212–125 | 10.8 |
| 125–75 | 4.9 |
| <75 | 2.7 |

I claim:

1. A process wherein a solid material is mixed with a liquid medium which is a liquid hydrocarbon, a liquid halohydrocarbon, a liquid compound of a transition metal of Group IVA to VIA of the Periodic Table, or a solution of a compound of a transition metal of Group IVA to VIA of the Periodic Table in a liquid hydrocarbon or liquid halohydrocarbon, the mixture of the solid material and the liquid medium is subjected to mechanical action to cause a reduction in particle size of the solid material, the resulting mixture is spray-dried and the spray-dried solid material is collected, wherein either (1) the solid material is at least one compound of a transition metal of Group IVA, VA or VIA of the Periodic Table or contains at least one compound of a transition metal of Group IVA, VA or VIA of the Periodic Table, or (2) the solid material is a metal halide which is free of any compound of a transition metal of Group IVA, VA, or VIA of the Periodic Table and after being subjected to the mechanical action, and before or after spray drying, the metal halide is contacted with at least one compound of a transition metal of Group IVA, VA or VIA of the Periodic Table.

2. The process of claim 1 wherein the solid material is titanium trichloride, a titanium compound on a support material or a magnesium halide.

3. The process of claim 2 wherein the solid material is a titanium compound supported on magnesium chloride or is magnesium chloride wherein the magnesium chloride has been ground with an ester of a carboxylic acid containing an aromatic group and thereafter contacted, before or after being subjected to the mechanical action and spray-drying, and without grinding, with titanium tetrachloride.

4. The process of claim 2 wherein the solid material is titanium trichloride and is ground with an ester of a carboxylic acid containing an aromatic group or with an organic phosphorus compound which is an organic phosphine, an organic phosphine oxide or an amino derivative thereof before being subjected to the mechanical action and spray-drying.

5. The process of claim 1 wherein sufficient of the liquid medium is added to the solid material to give a mixture which contains at least 1 cm$^3$, and up to 10 cm$^3$, of the liquid medium for each gramme of the solid material.

6. The process of claim 1 wherein the mixture of the solid material and the liquid medium is subjected to the mechanical action by grinding the mixture in a rotating ball mill or a vibrating ball mill.

7. The process of claim 1 wherein the mixture of the solid material and the liquid medium is subjected to the mechanical action by subjecting a suspension of the solid material in the liquid medium to a simultaneous vigorous agitation and shearing action.

8. The process of claim 7 wherein the simultaneous vigorous agitation and shearing action is effected by introducing the suspension of the solid material in the liquid medium into a device which is suitable for emulsifying an oil in a liquid which is immiscible therewith and agitating the suspension at a speed of at least 1000 rpm up to 10000 rpm.

9. The process of claim 1 wherein the mixture is spray-dried by passing the mixture through an atomizer to form a spray of droplets, the droplets are contacted with a stream of a gas, which is essentially oxygen- and water vapour-free and is at a temperature of at least 80° C., evaporation of the liquid medium from the droplets occurs and a separated solid product is collected.

10. The process of claim 1 wherein the mixture which is spray-dried includes an attrition inhibitor which renders the spray-dried solid more resistant to attrition.

11. A process for the production of a polymerisation catalyst which comprises (1) forming a transition metal composition by the process of claim 1; and mixing the product obtained with (2) an organic compound of aluminium or of a metal of Group IIA of the Periodic Table or a complex of an organic compound of a metal of Group IA or Group IIA of the Periodic Table together with an organic aluminium compound.

* * * * *